United States Patent
Takahashi et al.

(10) Patent No.: US 10,951,336 B2
(45) Date of Patent: Mar. 16, 2021

(54) DATA PROCESSING APPARATUS AND DATA PROCESSING METHOD

(71) Applicant: SONY SEMICONDUCTOR SOLUTIONS CORPORATION, Atsugi (JP)

(72) Inventors: Kazuyuki Takahashi, Chiba (JP); Yuichi Hirayama, Chiba (JP); Satoshi Okada, Tokyo (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 16/307,718

(22) PCT Filed: Aug. 17, 2017

(86) PCT No.: PCT/JP2017/029496
§ 371 (c)(1),
(2) Date: Dec. 6, 2018

(87) PCT Pub. No.: WO2018/043142
PCT Pub. Date: Mar. 8, 2018

(65) Prior Publication Data
US 2019/0268082 A1 Aug. 29, 2019

(30) Foreign Application Priority Data
Aug. 31, 2016 (JP) .............................. JP2016-170375

(51) Int. Cl.
*H04H 20/95* (2008.01)
*H04B 17/00* (2015.01)
(Continued)

(52) U.S. Cl.
CPC ......... *H04H 20/95* (2013.01); *H04B 17/0085* (2013.01); *H04H 20/74* (2013.01);
(Continued)

(58) Field of Classification Search
CPC .............. H04H 20/95; H04B 17/0085; H04N 21/85406; H04N 21/2343; H04N 21/6143;
(Continued)

(56) References Cited

U.S. PATENT DOCUMENTS

| | | | |
|---|---|---|---|
| 6,608,817 B1 * | 8/2003 | Ivory | H04L 41/12 345/629 |
| 7,965,778 B2 * | 6/2011 | Song | H04L 69/16 375/240.26 |

(Continued)

FOREIGN PATENT DOCUMENTS

| | | |
|---|---|---|
| CN | 1295749 A | 5/2001 |
| CN | 102596425 A | 7/2012 |

(Continued)

OTHER PUBLICATIONS

International Search Report dated Nov. 7, 2017 in PCT/JP2017/029496 filed Aug. 17, 2017.

(Continued)

*Primary Examiner* — Eugene Yun
(74) *Attorney, Agent, or Firm* — Oblon, McClelland, Maier & Neustadt, L.L.P.

(57) ABSTRACT

The present technology relates to a data processing apparatus and a data processing method capable of achieving higher convenience in a case where a plurality of transmission formats is available in a transmission frame. The data processing apparatus installed in a transmission-side facility processes a transmission frame transmitted as a broadcast signal and adds identification information for identifying the transmission format of the transmission frame, while a data processing apparatus installed in a reception-side facility processes a transmission frame in which a transmission frame has been identified, on the basis of identification information added to the transmission frame transmitted as (Continued)

the broadcast signal. The present technology can be applied as a method of a test stream, for example.

20 Claims, 17 Drawing Sheets

(51) Int. Cl.
*H04N 21/854* (2011.01)
*H04N 21/2343* (2011.01)
*H04N 21/61* (2011.01)
*H04H 60/25* (2008.01)
*H04N 21/643* (2011.01)
*H04H 20/74* (2008.01)
*H04N 21/2381* (2011.01)
*H04N 21/2383* (2011.01)
*H04N 21/438* (2011.01)

(52) U.S. Cl.
CPC ........ *H04H 60/25* (2013.01); *H04N 21/2343* (2013.01); *H04N 21/2381* (2013.01); *H04N 21/6125* (2013.01); *H04N 21/6143* (2013.01); *H04N 21/64322* (2013.01); *H04N 21/85406* (2013.01); *H04N 21/2383* (2013.01); *H04N 21/4382* (2013.01)

(58) Field of Classification Search
CPC ......... H04N 21/64322; H04N 21/6125; H04N 21/2381; H04N 21/2383; H04N 21/4382
USPC ....................................... 455/67.14
See application file for complete search history.

(56) References Cited

U.S. PATENT DOCUMENTS

| | | | |
|---|---|---|---|
| 2003/0070172 A1* | 4/2003 | Matsuzaki | H04H 20/38 725/87 |
| 2005/0053008 A1* | 3/2005 | Griesing | H04L 43/50 370/241 |
| 2012/0100881 A1* | 4/2012 | Son | H04W 52/0216 455/521 |
| 2013/0297757 A1* | 11/2013 | Han | H04L 41/0806 709/222 |
| 2014/0112175 A1* | 4/2014 | Pantelidou | H04W 28/26 370/252 |
| 2016/0261358 A1* | 9/2016 | Iguchi | H04L 69/04 |

FOREIGN PATENT DOCUMENTS

| | | |
|---|---|---|
| CN | 105612754 A | 5/2016 |
| JP | 61-281634 A | 12/1986 |
| WO | WO 2010/106796 A1 | 9/2010 |
| WO | WO 2016/098601 A1 | 6/2016 |

OTHER PUBLICATIONS

Extended European Search Report dated Jul. 16, 2019 in corresponding European Patent Application No. 17846150.5, 8 pages.
Office Action dated Apr. 9, 2020 in corresponding European Patent Application No. 17 846 150.5, 6 pages.
Combined Chinese Office Action and Search Report dated Feb. 26, 2020 in corresponding Chinese Patent Application No. 201780051281.5 (with English Translation), 13 pages.

* cited by examiner

FIG. 3 pcap FORMAT

| Global Header | Packet Header | Packet Data | Packet Header | Packet Data | Packet Header | Packet Data | ... |

FIG. 4

```
Global Header uint32  magic_number;    // pcap FORMAT FILE IDENTIFIER (0xa1b2c3d4)
uint16  version_major;   // MAJOR VERSION NUMBER (2)
uint16  version_minor;   // MINOR VERSION NUMBER (4)
int32   thiszone;        // TIME ZONE IN WHICH STREAM IS RECORDED
uint32  sigfigs;         // ACCURACY OF RECORDED TIMESTAMP
uint32  snaplen;         // MAXIMUM PACKET SIZE TO BE RECORDED
uint32  linktype;        // LINK LAYER HEADER TYPE (Ethernet=1)
```

FIG. 5

```
Packet Header uint32    ts_sec;     // TIMESTAMP (SECOND)
uint32    ts_usec;    // TIMESTAMP (MICROSECOND)
uint32    caplen;     // CAPTURED PACKET LENGTH
uint32    len;        // ORIGINAL PACKET LENGTH
```

FIG. 6

```
Packet data uint48   dst_mac_addr;   // DESTINATION MAC ADDRESS
uint48   src_mac_addr;   // SOURCE MAC ADDRESS
uint16   pkt_type;       // PACKET TYPE (IP v4=0x0800)
var      payload         // PAYLOAD
```

FIG. 8

| Syntax | bit | Semantics |
|---|---|---|
| Protocol_Subtype | 15-8 | FUTURE RESERVATION |
| | 7 | PRESENCE/ABSENCE OF EXTENSION INFORMATION (1: WITH EXTENSION INFORMATION, 0: NO EXTENSION INFORMATION) |
| | 6 | PRESENCE/ABSENCE OF TIMESTAMP (1: WITH TIMESTAMP, 0: NO TIMESTAMP) |
| | 5 | PRESENCE/ABSENCE OF TMCC INFORMATION (1: WITH TMCC INFORMATION, 0: NO TMCC INFORMATION) |
| | 4 | PRESENCE/ABSENCE OF BCH/S/LDPC PARITY (1: WITH PARITY, 0: NO PARITY) |
| | 3 | DATA PACKET CONFIGURATION (1: SINGLE TLV PACKET, 0: PLURALITY OF TLV PACKETS) |
| | 2-0 | Protocol ((0:Format A, 1:Format B, 2:Format C, 3-6: FUTURE RESERVATION, 7: SPECIFY INDIVIDUAL DATA SEPARATELY (SPECIFY BY USING BIT-3 TO BIT-15)) |

FIG. 13

ARRANGE ADDITIONAL INFORMATION ON HEAD PACKET

| Global Header | Packet Header | Packet Data (ADDITIONAL INFORMATION) | Packet Header | Packet Data | Packet Header | Packet Data | Packet Header | Packet Data | ... |

DATA PROCESSING APPARATUS AND DATA PROCESSING METHOD

TECHNICAL FIELD

The present technology relates to a data processing apparatus and a data processing method, and more particularly to a data processing apparatus and a data processing method capable of achieving higher convenience in a case where a plurality of transmission formats is available in a transmission frame.

BACKGROUND ART

Test streams are sometimes used in order to support the development of receivers compatible with digital broadcasting services. For example, creation of test streams is also assumed in advanced digital satellite broadcasting (refer to Non-Patent Document 1, for example).

CITATION LIST

Non-Patent Document

Non-Patent Document 1: ARIB standards TR-B39 Version 1.0 Association of Radio Industries and Businesses

SUMMARY OF THE INVENTION

Problems to be Solved by the Invention

Meanwhile, it is assumed, in the use of a test stream, that a plurality of transmission formats is to be available as a transmission format of a transmission frame as a test stream, and there is a demand for capability of identifying these transmission formats. However, there is no technical scheme established for achieving this demand at the present time.

The present technology has been made in view of such a situation, and aims to achieve higher convenience by enabling identification of transmission formats in a case where a plurality of transmission formats is available in a transmission frame.

Solutions to Problems

A data processing apparatus according to a first aspect of the present technology includes a processing unit that processes a transmission frame transmitted as a broadcast signal and adds identification information for identifying the transmission format of the transmission frame.

The data processing apparatus according to the first aspect of the present technology may be an independent apparatus or may be an internal block constituting one apparatus. Furthermore, a data processing method according to the first aspect of the present technology is a data processing method corresponding to the data processing apparatus according to the first aspect of the present technology described above.

With the use of the data processing apparatus and the data processing method according to the first aspect of the present technology, a transmission frame transmitted as a broadcast signal is processed and identification information for identifying the transmission format of the transmission frame is added.

A data processing apparatus according to a second aspect of the present technology includes a processing unit that processes a transmission frame in which a transmission format has been identified on the basis of identification information added to the transmission frame transmitted as a broadcast signal, the identification information being for identifying the transmission format of the transmission frame.

The data processing apparatus according to the second aspect of the present technology may be an independent apparatus or may be an internal block constituting one apparatus. Furthermore, a data processing method according to the second aspect of the present technology is a data processing method corresponding to the data processing apparatus according to the second aspect of the present technology described above.

With the use of the data processing apparatus and the data processing method according to the second aspect of the present technology, a transmission frame in which a transmission format has been identified is processed on the basis of identification information added to the transmission frame transmitted as a broadcast signal, the identification information being for identifying the transmission format of the transmission frame.

Effects of the Invention

According to the first and second aspects of the present technology, it is possible to achieve higher convenience in a case where a plurality of transmission formats is available in a transmission frame.

Note that effects described herein are non-restricting. The effects may be any of effects described in the present disclosure.

BRIEF DESCRIPTION OF DRAWINGS

FIG. 3 is a diagram illustrating a structure of a pcap format file.

FIG. 4 is a diagram illustrating details of a global header.

FIG. 5 is a diagram illustrating details of a packet header.

FIG. 6 is a diagram illustrating details of packet data.

FIG. 8 is a diagram illustrating an example of a syntax of a protocol subtype.

FIG. 13 is a diagram illustrating an example of arranging additional information in a head packet.

MODE FOR CARRYING OUT THE INVENTION

Hereinafter, embodiments of the present technology will be described with reference to the drawings. Note that the description will be given in the following order.

1. System configuration
2. Structure of transmission frame of the present technology
3. Modification of transmission format
4. Flow of processing corresponding to test stream
5. Modification
6. Configuration of computer <1. System Configuration>

(Exemplary Configuration of Transmission System)

Figure 1:
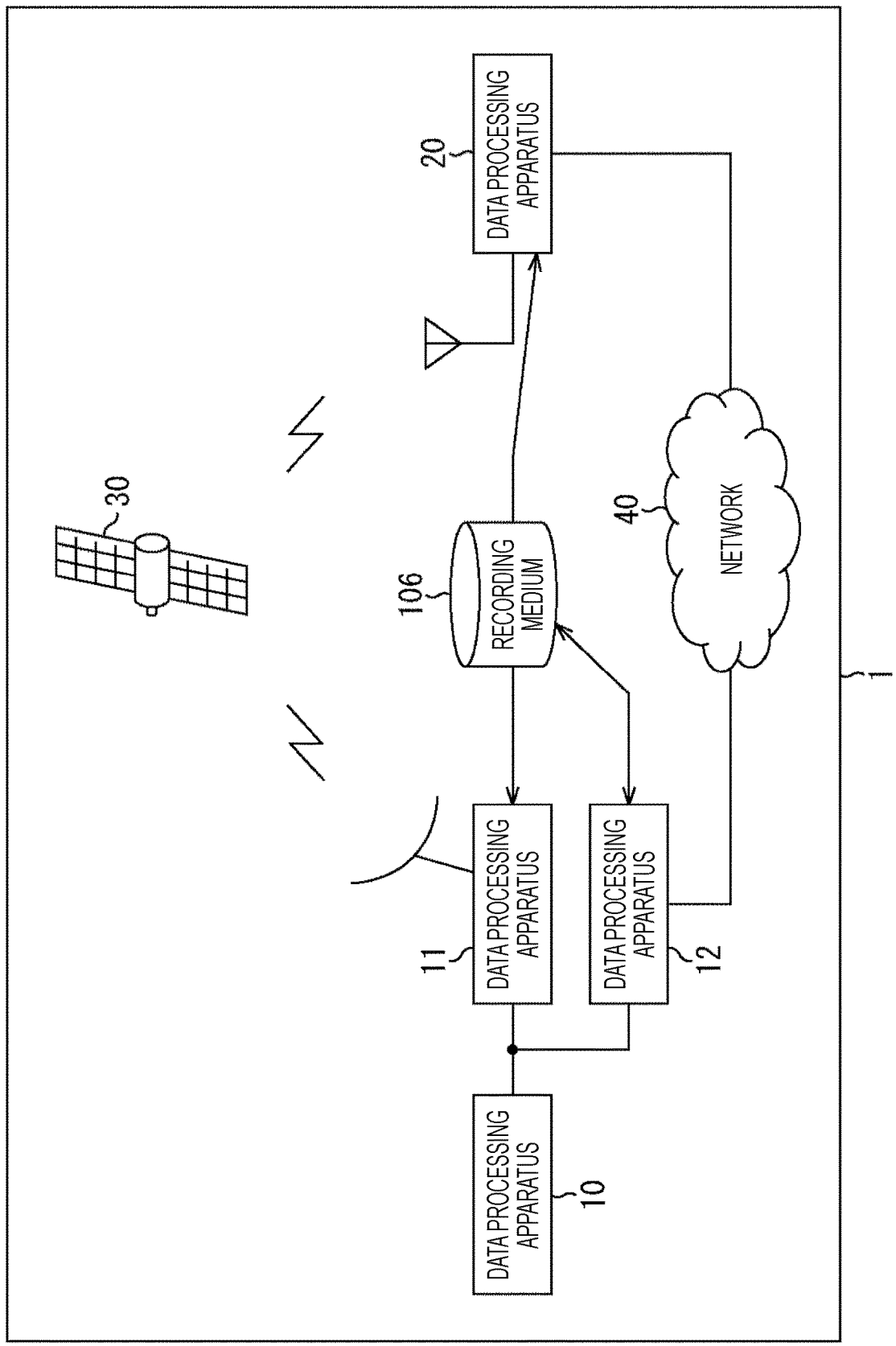
FIG. 1 is a block diagram illustrating a configuration according to an embodiment of a transmission system to which the present technology is applied.

FIG. 1 is a block diagram illustrating a configuration according to an embodiment of a transmission system to which the present technology is applied. Note that the term "system" represents a logical set of a plurality of apparatuses.

In FIG. 1, a transmission system 1 includes a data processing apparatus 10, a data processing apparatus 11, and a data processing apparatus 12, which are provided on the transmission side, and a data processing apparatus 20 which is provided on the reception side.

The data processing apparatus 10 is installed in, for example, a facility associated with a broadcasting station. The data processing apparatus 10 processes data of content such as a broadcast program produced by a broadcasting station and transmits a resulting transmission frame to the data processing apparatus 11 and data processing apparatus 12 via a predetermined communication line such as a dedicated line.

The data processing apparatus 11 is installed in a transmission facility such as an uplink station, for example. The data processing apparatus 11 receives a transmission frame transmitted from the data processing apparatus 10 via the communication line. The data processing apparatus 11 performs necessary processing (for example, modulation processing, etc.) on the transmission frame received from the data processing apparatus 10 and directs (uplinks) a resulting broadcast signal toward a broadcasting satellite 30 present on the earth's orbit.

The broadcasting satellite 30 receives and processes the broadcasting signal transmitted from the data processing apparatus 11 and retransmits (downlinks) the processed signal toward the earth.

Note that while the transmission path of the satellite broadcasting using, for example, a broadcasting satellite (BS) or a communications satellite (CS) is described as the transmission line (broadcast transmission line) here, it is also allowable to use other transmission paths such as terrestrial method (terrestrial broadcasting) and cable broadcasting using cable (Common Antenna TeleVision (CATV)). In the following description, the transmission path in satellite broadcast will be described as an example of a broadcast transmission line.

The data processing apparatus 20 is, for example, a receiver installed in a user's facility. For example, the data processing apparatus 20 may be a fixed receiver such as a television receiver, a set top box (STB), a recorder or a network storage, or a mobile receiver such as a smartphone, a mobile phone, and a tablet computer. Furthermore, the data processing apparatus 20 may also be an in-vehicle device mounted on a vehicle, such as an in-vehicle TV, a wearable computer such as a head mounted display (HMD), or the like.

The data processing apparatus 20 receives a broadcast signal transmitted from the broadcasting satellite 30 via an antenna and performs necessary processing (for example, demodulation processing or the like) on the signal. The data processing apparatus 20 processes a transmission frame obtained from the broadcast signal and outputs content data such as a broadcast program obtained as a result.

For example, the data processing apparatus 12 is installed in a facility such as a provider related to a test stream. The data processing apparatus 12 receives a transmission frame transmitted from the data processing apparatus 10 via a communication line.

Here, the transmission frame is data obtained from test data (hereinafter referred to as a test stream). The data processing apparatus 12 performs necessary processing on the transmission frame as a test stream, and generates a file of a predetermined format. Subsequently, the test stream including files of a predetermined format is recorded on a recording medium 106.

The test stream recorded on the recording medium 106 is read out and reproduced, and then input to the data processing apparatus 11 installed in a transmission facility or the data processing apparatus 20 installed in a user's facility. With this configuration, the data processing apparatus 20 can obtain a test stream via the recording medium 106.

Furthermore, the data processing apparatus 11 obtains a test stream reproduced from the recording medium 106. The data processing apparatus 11 performs necessary processing (for example, modulation processing, etc.) on the test stream, and transmits a resulting broadcast signal to the broadcasting satellite 30. With this configuration, the data processing apparatus 20 can receive and process the broadcast signal transmitted from the broadcasting satellite 30, and can obtain the test stream via broadcasting.

Furthermore, the data processing apparatus 12 processes the transmission frame transmitted from the data processing apparatus 10, and generates a test stream including packets of a predetermined format. The data processing apparatus 12 transmits the test stream including packets of a predetermined format to the data processing apparatus 20 via a network 40. With this configuration, the data processing apparatus 20 can receive the test stream transmitted via the network 40, and can obtain the test stream via communication.

Note that the test stream recorded on the recording medium 106 may be input (re-input) to the data processing apparatus 12. In this case, the data processing apparatus 12 transmits the test stream reproduced from the recording medium 106 to the data processing apparatus 20 via the network 40.

That is, a test stream is provided (input) to the data processing apparatus 20 by the recording medium 106, or via broadcasting or via communication. The test stream provided in this manner is processed by the data processing apparatus 20 so as to be used to support the development of receivers, in the form of various types of evaluation, verification, and the like, for example.

Note that the data processing apparatus 12 is installed not only within a facility of a provider, etc. related to a test stream but may also be installed within other facilities such as a facility related to a broadcasting station or a transmission facility such as an uplink station, for example.

Furthermore, in the following description, the four data processing apparatuses 10, 11, 12, and 20 will also be referred to as the broadcasting station-side data processing apparatus 10, the uplink station-side data processing apparatus 11, the test provider-side data processing apparatus 12, and the user-side data processing apparatus 20 so as to distinguish between the four. Furthermore, the data processing apparatuses 10, 11, and 12 will also be collectively referred to as the transmission-side data processing apparatus. In contrast, the data processing apparatus 20 will also be referred to as the reception-side data processing apparatus.

The configuration of the transmission system 1 is as described above.

(Exemplary Configuration of Data Processing Apparatus)

Figure 2:
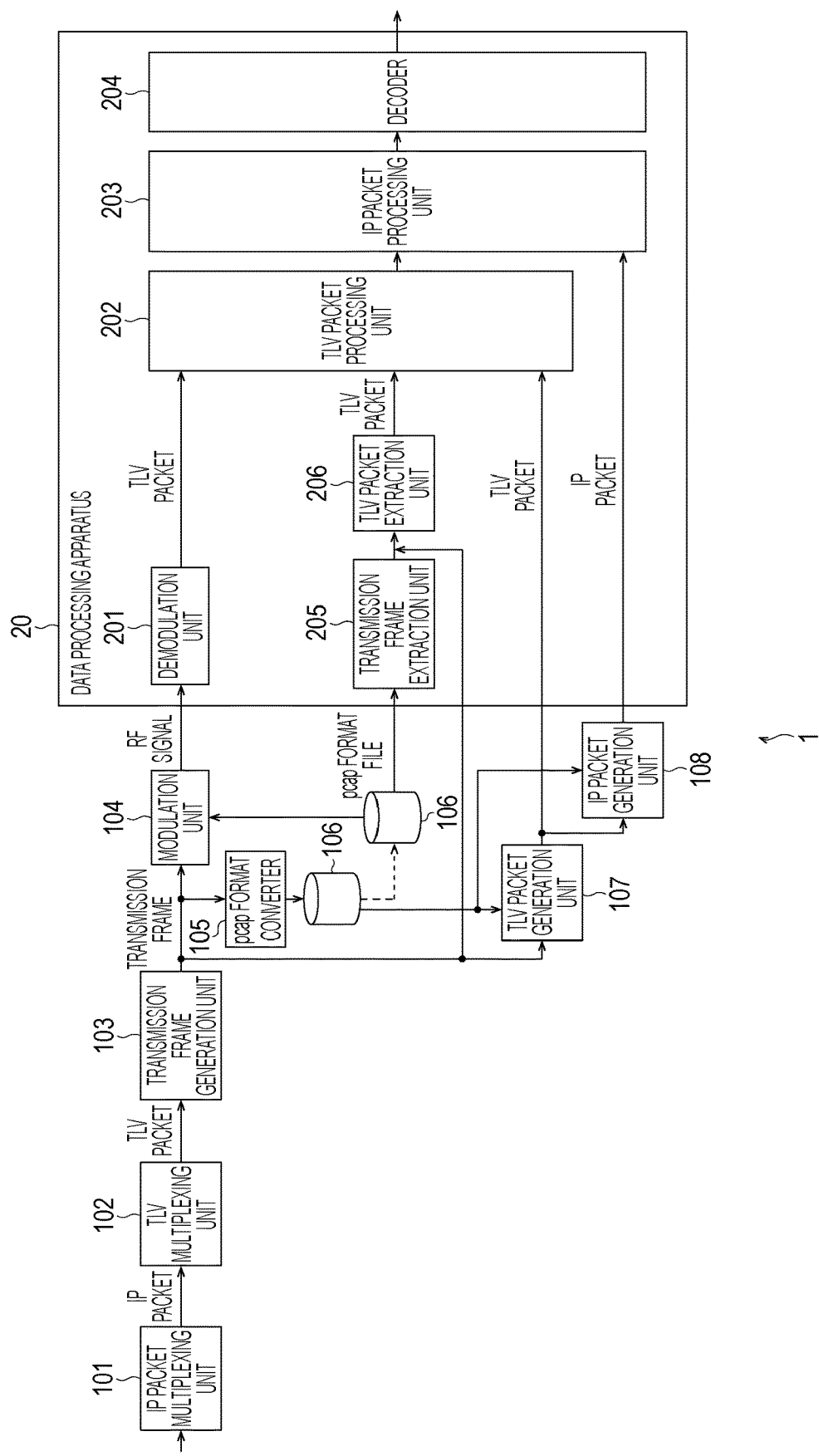
FIG. 2 is a block diagram illustrating a configuration example of each of data processing apparatuses in a transmission system.

FIG. 2 is a block diagram illustrating a configuration example of each of the data processing apparatuses in a transmission system illustrated in FIG. 1.

In FIG. 2, since each of the transmission-side data processing apparatuses 10, 11, and 12 can adopt various modes, illustration of which block constitutes which data processing apparatus is not specifically given. However, the following configurations are examples that can be adopted.

That is, an IP packet multiplexing unit 101, a TLV multiplexing unit 102, and a transmission frame generation unit 103 can be defined as constituents of the broadcasting station-side data processing apparatus 10. Furthermore, a modulation unit 104 can be defined as a constituent of the uplink station-side data processing apparatus 11.

Furthermore, a pcap format converter 105, the recording medium 106, a TLV packet generation unit 107, and an IP packet generation unit 108 can be defined as constituents of the test provider-side data processing apparatus 12. Alternatively, the constituent of the data processing apparatus 12 such as the pcap format converter 105 can be defined as a constituent of the broadcasting station-side data processing apparatus 10 or the uplink station-side data processing apparatus 11.

The IP packet multiplexing unit 101 processes video and audio components to be input and a stream of control information of an upper layer, multiplexes the stream onto an Internet Protocol (IP) packet, and outputs a resulting IP packet stream to the TLV multiplexing unit 102.

Note that the control information of the upper layer is control information of an upper layer than a physical layer, and includes two types of control information, namely, TLV-signal information (TLV-SI) and MMT signaling information (MMT-SI), for example. TLV-SI is control information related to the TLV multiplexing scheme for multiplexing IP packets. In addition, MMT-SI is control information related to MPEG Media Transport (MMT) which is a media transport scheme.

The TLV multiplexing unit 102 processes a stream of the IP packet received from the IP packet multiplexing unit 101, multiplexes the stream into a Type Length Value (TLV) packet, and supplies the resulting stream of the TLV packet to the transmission frame generation unit 103.

Note that the TLV packet is a packet for transmitting the IP packet on the broadcast transmission line. The TLV packet is a variable length packet, having a size of 4 to 65536 bytes, for example.

The transmission frame generation unit 103 uses the stream of the TLV packet from the TLV multiplexing unit 102 to generate a transmission frame, and supplies the generated transmission frame to the modulation unit 104. Note that although details will be described later with reference to FIG. 7, this transmission frame is generated as a frame format of Ethernet (registered trademark).

The modulation unit 104 performs necessary processing such as modulation processing on the transmission frame from the transmission frame generation unit 103, and sends out (transmits) a resulting broadcast signal as an RF signal. Thereafter, the broadcast signal transmitted (sent out) from the modulation unit 104 of the uplink station-side data processing apparatus 11 is received by the user-side data processing apparatus 20 via the broadcasting satellite 30 (FIG. 1).

The user-side data processing apparatus 20 includes a demodulation unit 201, a TLV packet processing unit 202, an IP packet processing unit 203, a decoder 204, a transmission frame extraction unit 205, and a TLV packet extraction unit 206.

The demodulation unit 201 receives a broadcast signal from the broadcasting satellite 30 via the antenna. The demodulation unit 201 performs necessary processing such as demodulation processing on the broadcast signal as the RF signal, and processes the resulting transmission frame. Furthermore, the demodulation unit 201 processes the transmission frame and supplies the resulting stream of the TLV packet to the TLV packet processing unit 202.

The TLV packet processing unit 202 processes the stream of the TLV packet from the demodulation unit 201 and supplies the resulting stream of the IP packet to the IP packet processing unit 203.

The IP packet processing unit 203 processes the stream of the IP packet from the TLV packet processing unit 202 and supplies the resulting stream of video and audio to the decoder 204.

The decoder 204 decodes video and audio data obtained from the stream from the IP packet processing unit 203, and outputs resulting video and audio data to an external device. This allows reproduction of content such as a broadcast program on an external device.

Here, in the use of the test stream in the transmission system 1, there are the following three paths by which the reception-side (user-side) data processing apparatus 20 receives the test stream, for example.

That is, the first is a path for receiving the test stream via the recording medium 106, the second is a path for receiving the test stream via broadcasting, and the third is a path for receiving the test stream via communication, as described above. Hereinafter, a case where the test stream is received by each of the paths will be described in detail.

Example in a Case where a Test Stream is Received Via Recording Medium

First, a case where the user-side data processing apparatus 20 receives the test stream via the recording medium 106 will be described.

In this case, the transmission frame generated by the transmission frame generation unit 103 of the broadcasting station-side data processing apparatus 10 is supplied to the pcap format converter 105 of the test provider-side data processing apparatus 12.

The pcap format converter 105 converts the transmission frame from the transmission frame generation unit 103 into a file of a pcap (packet capture) format, and records the pcap format file in the recording medium 106. That is, the stream of the transmission frame as the test stream here has been converted into the pcap format file.

For example, the recording medium 106 is a recording medium including a semiconductor memory such as a nonvolatile memory, an optical disc such as a digital versatile disc (DVD), a Blu-ray (registered trademark) disc, or a hard disk drive (HDD). Additionally, the pcap format is a file format used for packet sniffers in the field of computer network management. Note that details of the pcap format will be described later with reference to FIGS. 3 to 6.

For example, this recording medium 106 is moved from a test provider-side facility to a user-side facility, a test stream (pcap format file) recorded in the medium is read out (reproduced), and then input into the user-side data processing apparatus 20 (specifically, the transmission frame extraction unit 205 of the apparatus).

In the data processing apparatus 20, the transmission frame extraction unit 205 processes the test stream (pcap format file) read out from the recording medium 106 and extracts a transmission frame. The transmission frame extraction unit 205 supplies the extracted transmission frame to the TLV packet extraction unit 206.

The TLV packet extraction unit 206 processes the transmission frame supplied from the transmission frame extraction unit 205 and extracts a TLV packet. The TLV packet extraction unit 206 supplies a stream of the extracted TLV packet to the TLV packet processing unit 202.

The TLV packet processing unit 202 to the decoder 204 perform processing on TLV packets and IP packets as described above, so as to decode resulting video and audio data.

In this manner, the test stream (pcap format file) input via the recording medium 106 in the user-side data processing apparatus 20 is processed by the transmission frame extraction unit 205, the TLV packet extraction unit 206, the TLV packet processing unit 202 to the decoder 204, or the like, so as to be utilized to support development of receivers in the form of various types of evaluation, verification, or the like, for example.

Note that details of the processing performed by the data processing apparatus 20 will be described later with reference to FIGS. 7 and 8, and FIG. 15 or the like. Furthermore, while the description here is an exemplary case where the test stream is transferred as the pcap format file via the recording medium 106, it is also allowable to transfer the pcap format files in other methods such as transferring the pcap format file via other routes such as transfer through the network 40.

Example of Receiving Test Stream Via Broadcasting

Next, a case where the user-side data processing apparatus 20 receives a test stream via broadcasting will be described.

In this case, the transmission frame generated by the transmission frame generation unit 103 of the broadcasting station-side data processing apparatus 10 is supplied to the pcap format converter 105 of the test provider-side data processing apparatus 12 and then converted into a pcap format file. With this processing, the stream of the transmission frame as the test stream is converted into the pcap format file and then recorded on the recording medium 106.

For example, this recording medium 106 is moved from a test provider-side facility to an uplink station-side facility and the test stream (pcap format file) recorded therein is read out (reproduced) so as to be input into the uplink station-side data processing apparatus 11 (specifically, the modulation unit 104 of the apparatus).

In the data processing apparatus 11, the modulation unit 104 performs necessary processing such as modulation processing on the test stream (pcap format file) read out from the recording medium 106, and transmits a resulting broadcast signal. The broadcast signal transmitted (sent out) from the modulation unit 104 of the uplink station-side data processing apparatus 11 is received by the user-side data processing apparatus 20 via the broadcasting satellite 30 (FIG. 1).

In the data processing apparatus 20, the demodulation unit 201 receives the broadcast signal from the broadcasting satellite 30 via an antenna. The demodulation unit 201 performs necessary processing such as demodulation processing on the broadcast signal, and processes a resulting test stream (pcap format file). Furthermore, the demodulation unit 201 processes a transmission frame obtained from a pcap format file, and supplies the stream of the TLV packet obtained as a result to the TLV packet processing unit 202.

The TLV packet processing unit 202 to the decoder 204 perform processing on TLV packets and IP packets as described above, so as to decode resulting video and audio data.

In this manner, the test stream (pcap format file) input via broadcasting in the user-side data processing apparatus 20 is processed by the demodulation unit 201, the TLV packet processing unit 202 to the decoder 204, or the like, so as to be utilized to support development of receivers in the form of various types of evaluation, verification, and the like, for example.

Figure 16:
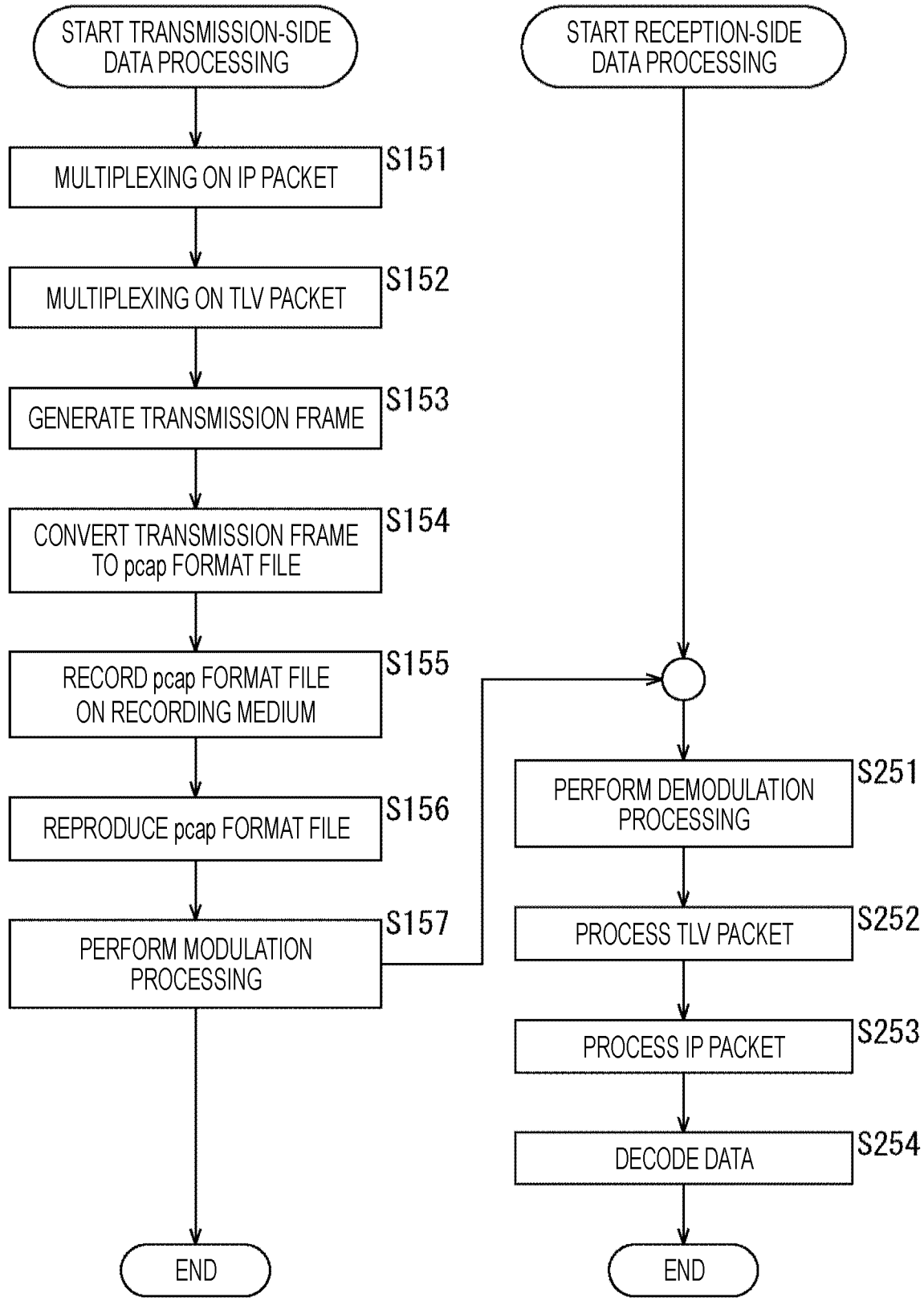
FIG. 16 is a flowchart illustrating a flow of test stream transmission/reception processing.

Note that details of the processing performed by the data processing apparatus 20 will be described later with reference to FIGS. 7 and 8, and FIG. 16 or the like.

Furthermore, in the case of evaluating the data processing apparatus 20 as a receiver, for example, the test stream output from the modulation unit 104 of the data processing apparatus 11 can be directly input to the data processing apparatus 20 as a receiver without uplinking.

(Exemplary Case of Receiving Test Stream Via Communication)

Next, a case where the user-side data processing apparatus 20 receives a test stream via communication will be described.

In this case, the transmission frame generated by the transmission frame generation unit 103 of the broadcasting station-side data processing apparatus 10 is supplied to the TLV packet generation unit 107 of the test provider-side data processing apparatus 12.

The TLV packet generation unit 107 processes the transmission frame supplied from the transmission frame generation unit 103 and generates a TLV packet. That is, here, the TLV packet is generated from the stream of the transmission frame as a test stream.

Subsequently, in the test provider-side data processing apparatus 12, the TLV packet generated by the TLV packet generation unit 107 is transmitted in a predetermined format to the user-side data processing apparatus 20 via the network 40. In addition, the data processing apparatus 12 here performs multicast distribution, thereby making it possible to notify TLV packets to a plurality of data processing apparatuses 20 connected to the network 40.

In addition, in the test provider-side data processing apparatus 12, the TLV packet generated by the TLV packet generation unit 107 is supplied to the IP packet generation unit 108. The IP packet generation unit 108 processes the TLV packet supplied from the TLV packet generation unit 107 and generates an IP packet. That is, here, the IP packet is generated from the stream of the TLV packet as a test stream.

Subsequently, the test provider-side data processing apparatus 12 transmits the IP packet generated by the IP packet generation unit 108 to the user-side data processing apparatus 20 via the network 40. In addition, the data processing apparatus 12 here performs multicast distribution, thereby making it possible to notify IP packets to a plurality of data processing apparatuses 20 connected to the network 40.

Note that while the description here is an exemplary case where a TLV packet or an IP packet is generated from a stream of a transmission frame as a test stream and transmitted via the network 40, the test provider-side data processing apparatus 12 may directly transmit the transmission frame in a predetermined format via the network 40. Furthermore, the test stream on the communication path may be generated from the test stream read from the recording medium 106 and reproduced.

In this manner, the transmission frame as a test stream can be transferred as a TLV packet, an IP packet, or transmission frame data via communication. Then, the user-side data processing apparatus 20 receives the TLV packet, the IP packet, or the transmission frame data from the test provider-side data processing apparatus 12 via the network 40, so as to receive test streams via communication.

In the user-side data processing apparatus 20, in a case where the test stream via communication is transmitted as TLV packet data, the TLV packet processing unit 202 processes the TLV packet.

Furthermore, in a case where a test stream via communication is transmitted as IP packet data in the data processing apparatus 20, the IP packet processing unit 203 processes the IP packet. Furthermore, in the data processing apparatus 20, in a case where a test stream via communication is transmitted as transmission frame data, the TLV packet extraction unit 206 processes the transmission frame.

In this manner, the test stream (TLV packet, IP packet, transmission frame) input via communication in the user-side data processing apparatus 20 is processed by the TLV packet extraction unit 206, the TLV packet processing unit 202 to the decoder 204, or the like, so as to be utilized to support development of receivers in the form of various types of evaluation, verification, and the like, for example.

<2. Structure of Transmission Frame of the Present Technology>

Meanwhile, in the use of a test stream, it is assumed that a plurality of transmission formats is available as a transmission format of a transmission frame as a test stream. Here, in a case where a plurality of transmission formats is available, for example, and in a case where it is not possible to identify the transmission format of the test stream (transmission frame) to be input to the uplink station-side data processing apparatus 11 (specifically, the modulation unit 104 of the apparatus) or the user-side data processing apparatus 20, there is a possibility that a wrong transmission format is selected, leading to incorrect operation.

In particular, in a case where the user manually selects the transmission format, there is a possibility of unintentional selection of an wrong transmission format. Selecting a wrong transmission format leads to incorrect operation, leading to lower convenience in the use of the test stream.

To overcome this problem, the present technology is provided with a capability of identifying a plurality of transmission formats of a test stream (transmission frame) in a case where the plurality of transmission formats is available as a transmission format of a test stream (transmission frame). This enables the uplink station-side data processing apparatus 11 and the user-side data processing apparatus 20 to select a correct transmission format in accordance with an identification result of the transmission format, making it possible to reliably perform correct operation. As a result, higher convenience is achieved in the use of a test stream.

Hereinafter, a structure of a transmission frame of the present technology will be described. Here, a structure of the pcap format file will be first described with reference to FIGS. 3 to 6, and thereafter a structure of the transmission frame of the present technology will be described with reference to FIGS. 7 to 8.

(Structure of Pcap Format File)

FIG. 3 is a diagram illustrating a structure of a pcap format file.

In FIG. 3, a pcap format file includes a global header arranged at the head and packets repeatedly arranged following the global header. Furthermore, the packet includes a packet header and packet data.

Here, the global header has a structure as illustrated in FIG. 4. That is, the global header includes magic_number, version_major, version_minor, thiszone, sigfigs, snaplen, and linktype.

magic_number is an identifier of a pcap format file. For example, "0xa1b2c3d4" is specified as this identifier. version_major represents a major version number. version_minor represents a minor version number.

thiszone represents a time zone in which a target stream has been recorded. sigfigs represents the accuracy of the recorded timestamp. snaplen represents the maximum size of the packet to be recorded. linktype represents the header type of a link layer. For example, "1" is specified in the case of Ethernet (registered trademark) as this type.

In addition, a packet header has a structure as illustrated in FIG. 5. That is, the packet header includes ts_sec, ts_usec, caplen, and len.

ts_sec represents a timestamp in seconds. ts_usec represents a timestamp in microseconds. caplen is an abbreviation of capture length and represents a captured packet length. len is an abbreviation of original length, and represents an original packet length.

Furthermore, the packet data has a structure as illustrated in FIG. 6. That is, the packet data includes dst_mac_addr, src_mac_addr, pkt_type, and payload.

dst_mac_addr represents a destination Media Access Control (MAC) address. src_mac_addr represents a source MAC address.

pkt_type represents a packet type. For example, as this type, "0x0800" is specified in the case of a packet corresponding to Internet Protocol version 4 (IPv4). payload represents a payload. For example, in a case where "0x0800" is specified as pkt_type, it is regarded as the payload of the IP packet.

The pcap format file is configured as described above.

In the pcap format converter 105 (FIG. 2) of the test provider-side data processing apparatus 12, the transmission frame as the test stream is converted into a pcap format file. That is, a transmission frame is arranged as packet data of a pcap format file. Next, a transmission frame according to the present technology will be described.

(Structure of Transmission Frame of the Present Technology)

Figure 7:
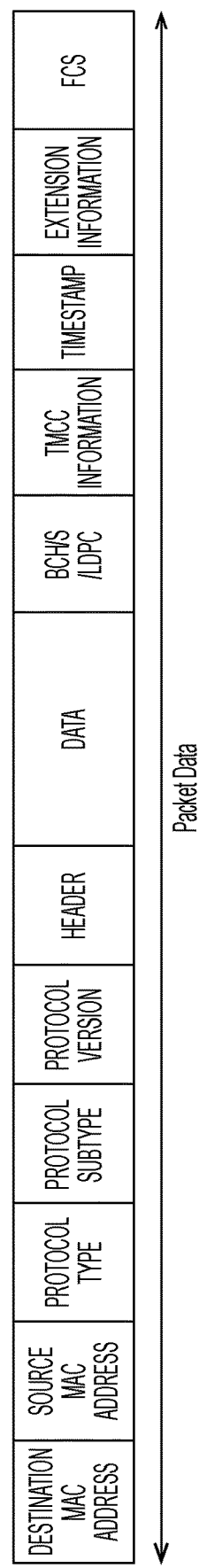
FIG. 7 is a diagram illustrating an example of a structure of a transmission frame of the present technology.

FIG. 7 is a diagram illustrating an example of a structure of a transmission frame of the present technology.

In FIG. 7, the transmission frame has data (transmission data) to be transmitted between stations, that is, the broadcasting station-side data processing apparatus 10 and the uplink station-side data processing apparatus 11, with the data being encapsulated with a frame format of Ethernet (registered trademark).

In FIG. 7, the transmission frame of the present technology includes a destination MAC address, a source MAC address, a protocol type, a protocol subtype, a protocol version, a header, data, a BCH/S/LDPC parity, TMCC information, a timestamp, extension information, and a frame check sequence (FCS).

The destination MAC address represents a MAC address of a destination device of the transmission frame. Here, for example, a MAC address of the uplink station-side data processing apparatus 11 is specified.

The source MAC address represents a MAC address of the transmission source device of the transmission frame. Here, for example, a MAC address of the broadcasting station-side data processing apparatus 10 is specified.

The protocol type represents a type for identifying an upper layer protocol. In this case, for example, a value defined by Institute of Electrical and Electronic Engineers (IEEE) is specified.

The protocol subtype represents a type difficult to specify by the protocol type. Types specified herein include, for example, identification information (hereinafter referred to as transmission format identification information) for identifying the transmission format of the transmission stream, information indicating the presence or absence of information such as TMCC information and timestamp (hereinafter referred to as presence information), or the like. Note that details of the protocol subtype will be described later with reference to FIG. 8.

The protocol version represents a version of the transmission format of the transmission frame. The protocol version is incremented one by one every time the information of the transmission format is updated. However, when the data contained in the transmission frame or the timestamp has been updated, the protocol version is not to be incremented.

For example, this protocol version enables recognition of the state that control information such as TMCC information has been updated in the uplink station-side data processing apparatus 11 (specifically, the modulation unit 104 of the apparatus) or the user-side data processing apparatus 20.

The header is, for example, a header added to an IP packet or a UDP packet.

The data includes a single TLV packet or a plurality of TLV packets.

A BCH/S/LDPC parity is a parity used in a BCH code, a stuff bit (S) and a Low Density Parity Check (LDPC) code. Details of the parity will be described later with reference to FIG. 10.

The Transmission & Multiplexing Configuration Control (TMCC) information is control information of the physical layer. That is, the TMCC information is information transmitted from the broadcasting station-side data processing apparatus 10 on the uplink station-side data processing apparatus 11 in order to obtain the TMCC information. The TMCC information includes modulation parameters, information indicating the type of data to be transmitted, etc. for each hierarchical layer. Note that details of the TMCC information are disclosed in the following non-patent document 2, for example.

Non-Patent Document 2: ARIB standards STD-B44 Version 2.1 Association of Radio Industries and Businesses The timestamp is time information for enabling the test stream to be processed at a correct timing. For example, this timestamp enables the uplink station-side data processing apparatus 11 (specifically, the modulation unit 104 of the apparatus) or the user-side data processing apparatus 20 to reproduce the test stream at a correct timing and to achieve appropriate buffering control.

The extension information is information to be used for extension. As this extension information, for example, it is possible to arrange any information such as emergency warning information.

The frame check sequence (FCS) is a checksum code added for performing error detection and error correction in the transmission frame. With this frame check sequence (FCS), the uplink station-side data processing apparatus 11 can check whether or not there is any error in the transmission frame received from the broadcasting station-side data processing apparatus 10.

The transmission frame of the present technology is configured as described above.

Note that the transmission frame having such a structure is generated by the transmission frame generation unit 103 or the pcap format converter 105. That is, the transmission frame generated by the transmission frame generation unit 103 may have the structure illustrated in FIG. 7, or the pcap format converter 105 may perform processing such that the structure of the transmission frame can be the structure illustrated in FIG. 7 in converting the transmission frame into a pcap format file.

Example of Protocol Subtype

FIG. 8 is a diagram illustrating an example of the syntax of the protocol subtype (Protocol Subtype) of FIG. 7. Note that in the following, binary numbers are represented by numerical values with "b" added at the end.

For example, 16 bits are allocated to the protocol subtype. The 16 bits of this protocol subtype are treated as bit strings.

As illustrated in FIG. 8, lower three bits (bit-0 to bit-2) from the least significant bit (LSB) to the third bit among the 16 bits (bit-0 to bit-15) of the protocol subtype represent a protocol between the data processing apparatuses, that is, the transmission format of the transmission frame.

That is, by handling the transmission format of the transmission frame represented here as transmission format identification information, it is possible to identify the transmission format of the transmission frame being a processing target even in a case where a plurality of transmission formats is available as a transmission format of a test stream (transmission frame).

Here, it is assumed, for example, that there are three types of transmission formats of transmission frames of a format A, a format B, and a format C.

For example, in a case where the Ethernet (registered trademark) frame format is adopted as a transmission format of the transmission frame transmitted between the stations, the format A represents a structure in which a TLV packet arranged in the transmission frame is located across the frames. Then, when the transmission format of the transmission frame is the format A, "0" (000b) is specified in the lower three bits (bit-0 to bit-2) of the protocol subtype.

Furthermore, for example, in a case where the Ethernet (registered trademark) frame format is adopted as a transmission format of the transmission frame transmitted between the stations, the format B represents a structure in which a TLV packet arranged in the transmission frame is not located across the frames. Then, when the transmission format of the transmission frame is the format B, "1" (001b) is specified in the lower three bits (bit-0 to bit-2) of the protocol subtype.

Furthermore, for example, the format C represents a structure in which a single TLV packet is arranged in a frame in a case where the Ethernet (registered trademark) frame format is adopted as a transmission format of the transmission frame transmitted between the stations. Then, when the transmission format of the transmission frame is the format C, "2" (010b) is specified in the lower three bits (bit-0 to bit-2) of the protocol subtype.

The bits "3" (011b) to "6" (110b) of the lower three bits (bit-0 to bit-2) of the protocol subtype are specified as future reservation regions. Furthermore, the bit "7" (111b) of the lower three bits (bit-0 to bit-2) of the protocol subtype is specified in a case where individual data is separately specified. In other words, in a case where "7" (111b) is specified in the lower three bits of the protocol subtype, 13 bits (bit-3 to bit-15) out of the 16 bits of the protocol subtype are used to separately specify the individual data.

Among the 16 bits of the protocol subtype, one bit located at the fourth bit from the least significant bit (LSB) represents the configuration of data (data packet) contained in the transmission frame. For example, in this one bit, "1" is specified in a case where the data (data packet) includes a single TLV packet and "0" is specified in a case where the data includes a plurality of TLV packets.

Among the 16 bits of the protocol subtype, one bit located at the fifth bit from the least significant bit (LSB) represents the presence or absence of BCH/S/LDPC parity. For example, in this one bit, "1" is specified in a case where BCH/S/LDPC parity is present, and "0" is specified in a case where BCH/S/LDPC parity is not present.

Among the 16 bits of the protocol subtype, one bit located at the sixth bit from the least significant bit (LSB) represents the presence or absence of TMCC information. For example, "1" is specified in this one bit in a case where TMCC information is present, and "0" is specified in a case where TMCC information is not present.

Among the 16 bits of the protocol subtype, one bit located at the seventh bit from the least significant bit (LSB) represents the presence or absence of a timestamp. For example, in this one bit, "1" is specified in a case where a timestamp is present, and "0" is specified in a case where the timestamp is not present.

Among the 16 bits of the protocol subtype, one bit located at the eighth bit from the least significant bit (LSB) represents the presence or absence of extension information. For example, in this one bit, "1" is specified in a case where extension information is present, and "0" is specified in a case where the extension information is not present.

In this manner, presence information indicating the presence or absence of each of BCH/S/LDPC parity, TMCC information, timestamp, and extension information is added at the fifth to eighth bits from the least significant bit (LSB) of the 16 bits forming the protocol subtype. The presence information enables selection of the BCH/S/LDPC parity, TMCC information, timestamp, and extension information included in the transmission frame, making it possible to arrange necessary information alone. This eliminates necessity to arrange unnecessary information, making it possible to reduce the size of the file.

Note that the upper 8 bits (bit-8 to bit-15) from the ninth bit to the most significant bit (MSB) of the 16 bits of the protocol subtype are defined as future reservation regions.

(Correspondence with the Current Standard)

Figure 9:
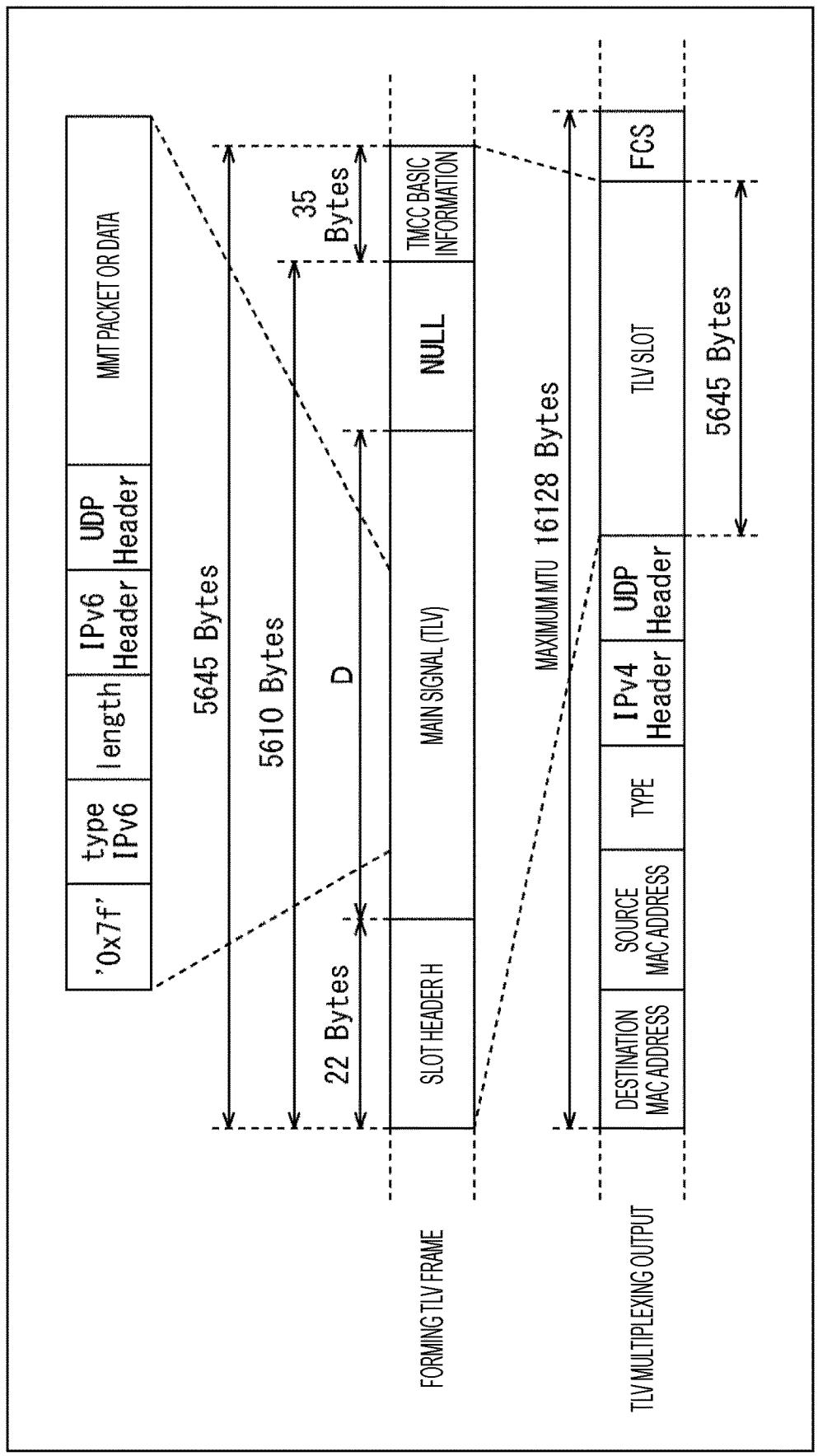
FIG. 9 is a diagram illustrating a transmission scheme of TMCC basic information in advanced digital satellite broadcasting.

Here, FIG. 9 illustrates a transmission scheme of TMCC basic information in advanced digital satellite broadcasting.

As illustrated in FIG. 9, on the broadcasting station side, a slot header of 22 bytes is added to a TLV packet as a main signal so as to allow TMCC basic information of 35 bytes to be added at the time of forming the TLV frame. Subsequently, the broadcasting station side encapsulates the TLV frame obtained in this manner in an Ethernet (registered trademark) frame format and then transmits the frame to the uplink station side as an output of TLV multiplexing.

This configuration makes it possible, on the uplink station side, to generate TMCC information by using the TMCC basic information transmitted from the broadcasting station side.

Meanwhile, while the above description is an example of arranging the TMCC information in the transmission frame of the present technology as illustrated in FIG. 7, it is also allowable to arrange the TMCC basic information illustrated in FIG. 9. In addition, at this time, in the protocol subtype, information indicating the presence or absence of TMCC basic information can be used in place of the presence information indicating the presence or absence of TMCC information illustrated in FIG. 8. That is, the transmission frame of the present technology can be applied to test streams used in advanced digital satellite broadcasting.

Note that details of the TMCC basic information are described in "Appendix 1 Transmission method and configuration of TMCC basic information" of "Chapter 8 Assignment of various numerical values" in the above Non-Patent Document 1, and thus, detailed description thereof will be omitted.

Figure 10:
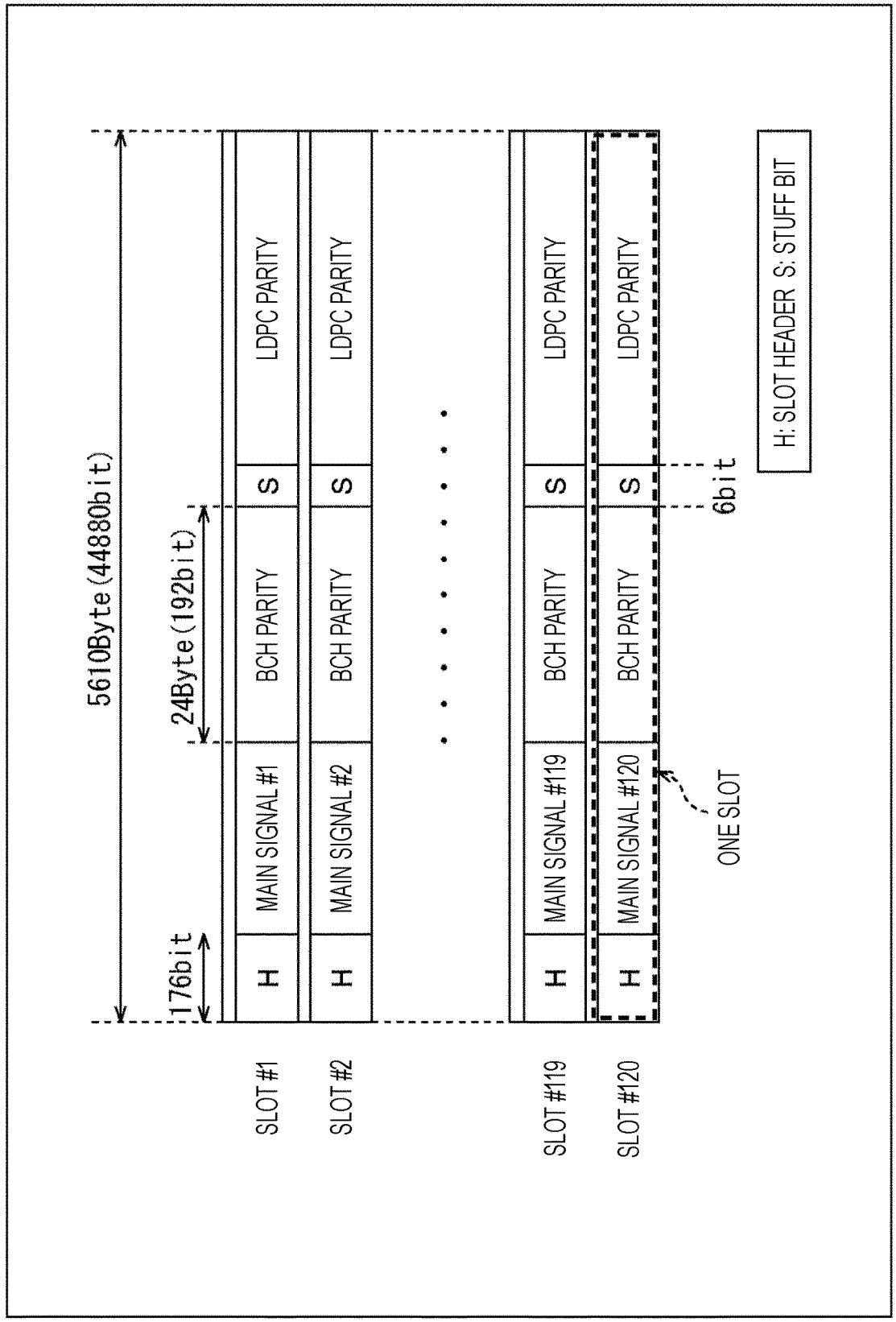
FIG. 10 is a diagram illustrating a frame configuration of a transmission main signal in advanced digital satellite broadcasting.

In addition, FIG. 10 illustrates a frame configuration of a transmission main signal in the advanced digital satellite broadcasting. In a case where the transmission frame of the present technology is applied to a test stream used in advanced digital satellite broadcasting, data in a slot unit as illustrated in FIG. 10 is to be arranged in "data" illustrated in FIG. 7.

Note that details of the frame configuration of the transmission main signal are described in, for example, "3.2 Frame configuration of multiplex signals" of "Chapter 3 Transmission line coding scheme" in the above Non-Patent Document 2, and thus, detailed description thereof will be omitted here.

Furthermore, the BCH/S/LDPC parity arranged in the transmission frame illustrated in FIG. 7 corresponds to the BCH parity, the stuff bit (S), and the LDPC parity in FIG. 10.

<3. Modification of Transmission Format>

As described above, in the transmission frame of the present technology, presence information indicating the presence or absence of TMCC information, a timestamp or the like is added as the protocol subtype together with transmission format identification information. Accordingly, it is possible to selectively arrange the TMCC information, the timestamp, or the like.

Meanwhile, the transmission frame of the present technology is converted into a pcap format file, so that a global header and a packet header are added. The present technology uses the structure of this pcap format file to store information such as a protocol subtype, TMCC information and timestamp as additional information, thereby suppressing an increase in the size of a pcap format file, making it possible to reduce the file size.

Hereinafter, such a structure will be described as a modification of the transmission format of the transmission frame of the present technology.

(Global Header Extension)

Figure 11:
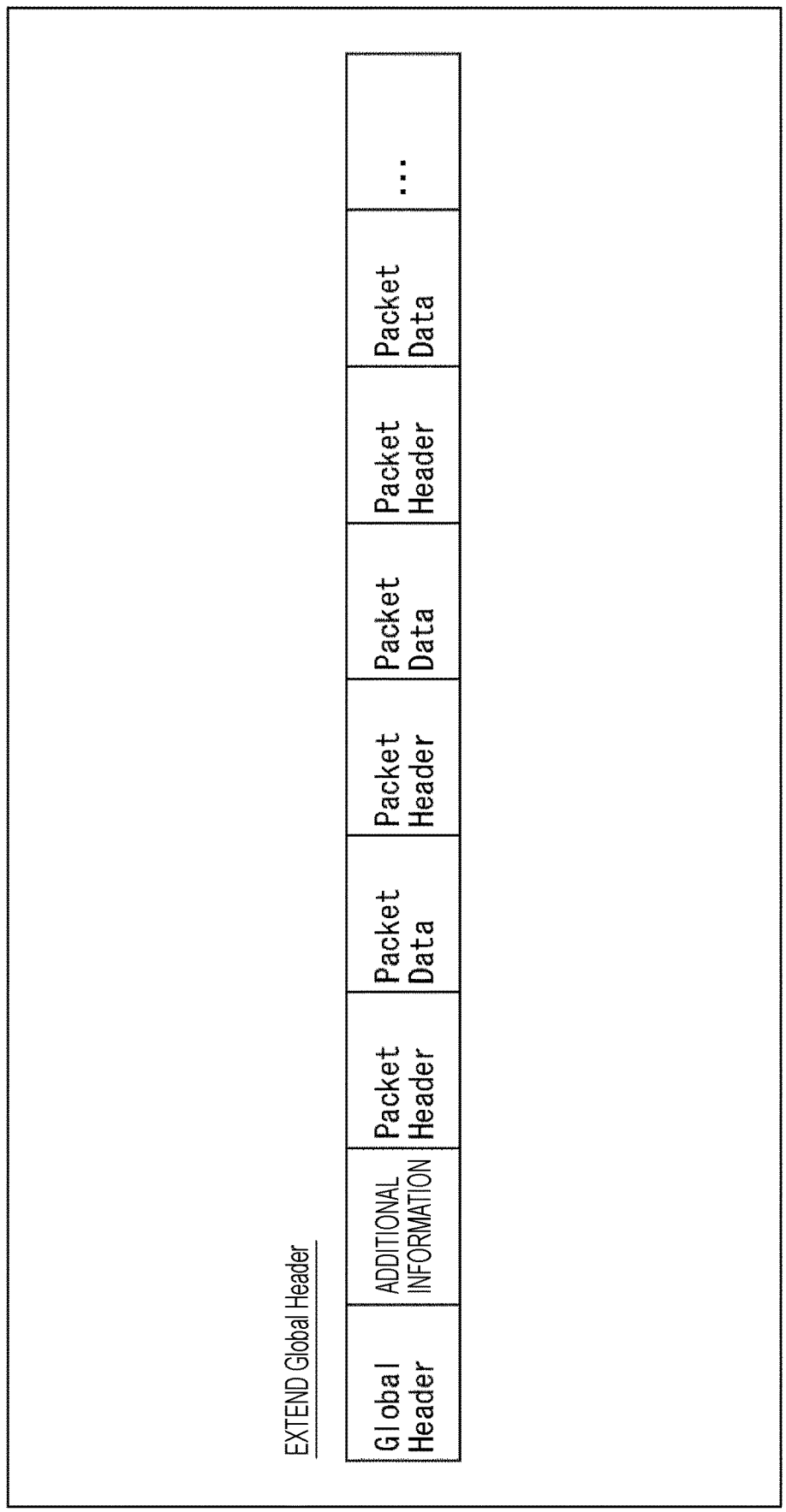
FIG. 11 is a diagram illustrating an example of arranging additional information in an extension region of a global header.

FIG. 11 is a diagram illustrating an example of arranging additional information in an extension region of a global header.

In FIG. 11, the global header arranged at the head of the pcap format file is extended to arrange additional information such as a protocol subtype, TMCC information, and timestamp.

Adopting such a structure allows the additional information to be arranged solely in the extension region of the global header, rather than being arranged for the repeatedly arranged subsequent packets (packet header and packet data). Therefore, it is possible to reduce the file size of the pcap format, for example, as compared with the case where information such as the protocol subtype, TMCC information, and timestamp is arranged as packet data.

In addition, information such as TMCC information and timestamp can be arranged in the extension region of the global header selectively as additional information including necessary information alone, suppressing arrangement of unnecessary information, making it possible to further reduce the size of the pcap format file.

Note that the presence or absence of information such as TMCC information and timestamp can be discriminated by presence information (presence information indicating presence or absence of information such as TMCC information and timestamp) included in the protocol subtype. Furthermore, additional information may include not only TMCC information and timestamp but also include other information such as extension information, for example.

(Packet Header Extension)

Figure 12:
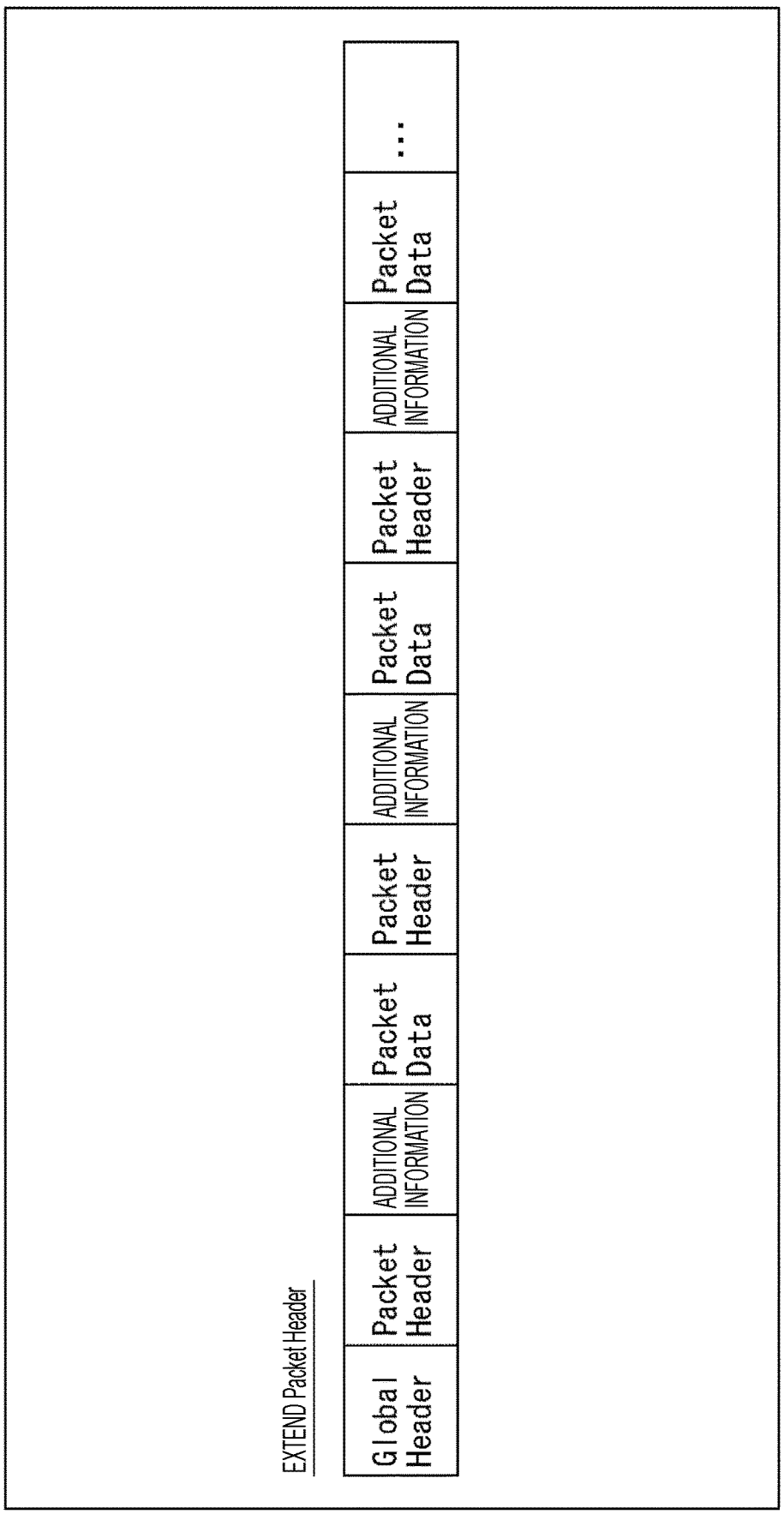
FIG. 12 is a diagram illustrating an example of arranging additional information in an extension region of a packet header.

FIG. 12 is a diagram illustrating an example of arranging additional information in an extension region of a packet header.

In FIG. 12, a packet header arranged in a pcap format file is extended to arrange additional information such as a protocol subtype, TMCC information and timestamp.

Adopting such a structure allows the additional information to be arranged in the extension region of the packet header of the packet repeatedly arranged to follow the global header. At this time, the information such as the TMCC information and timestamp can be arranged selectively as additional information including necessary information alone, in the extension region of the packet header. Accordingly, suppressing arranging unnecessary information as additional information makes it possible to reduce the size of the pcap format file.

Note that the presence or absence of information such as TMCC information and timestamp can also here be discriminated by presence information included in the protocol type. Furthermore, while the example of FIG. 12 is a case where the additional information is repeatedly arranged for the extension region of the packet header of the repeatedly arranged packet, it is also allowable to arrange the additional information in the packet header of the head packet alone.

Furthermore, it is also allowable to make the additional information arranged in the extension region of the packet header of the repeatedly arranged packet to be mutually different. For example, it is possible to distribute and arrange information such that the protocol subtype alone is allocated to an additional region of the packet header of the first packet, and that TMCC information and the timestamp alone are allocated to an additional region of the packet header of the second packet.

(Arranging Additional Information in Head Packet)

FIG. 13 is a diagram illustrating an example of arranging additional information in the head packet.

In FIG. 13, additional information such as protocol subtype, TMCC information and timestamp is to be arranged solely in the packet data of the packet arranged at the head of the pcap format file.

Adopting such a structure allows the additional information to be arranged solely in the packet data of the head packet, rather than being arranged for the repeatedly arranged subsequent packets (packet header and packet data). Therefore, it is possible to reduce the file size of the pcap format, for example, as compared with the case where information such as the protocol subtype, TMCC information, and timestamp is arranged as packet data.

In addition, information such as TMCC information and timestamp can be arranged in the packet data of the head packet selectively as additional information including necessary information alone, suppressing arrangement of unnecessary information, making it possible to further reduce the size of the pcap format file.

Note that the presence or absence of information such as TMCC information and timestamp can also here be discriminated by presence information included in the protocol type.

(Recording Additional Information as Another File)

Figure 14:
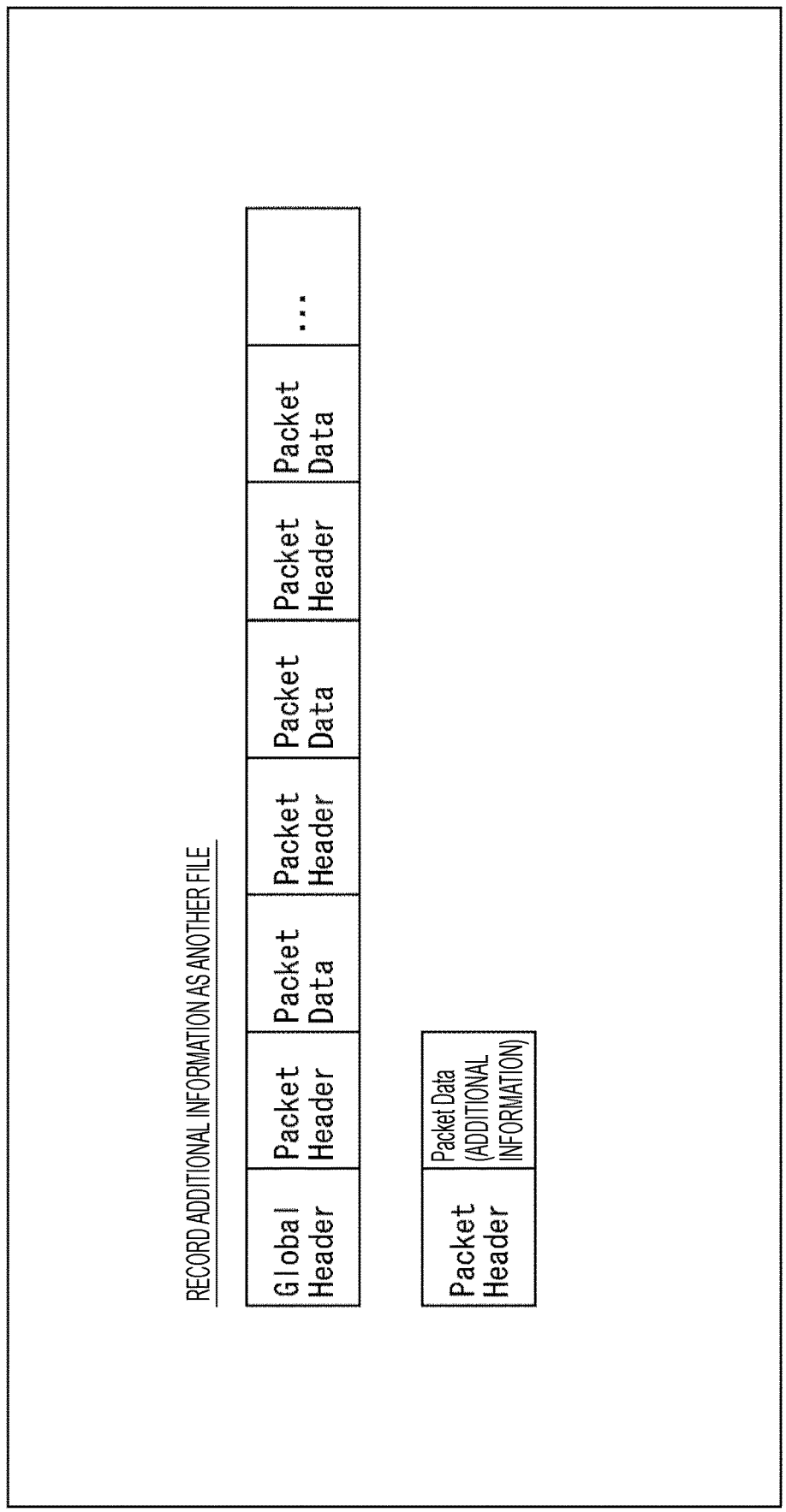
FIG. 14 is a diagram illustrating an example of recording additional information as another file.

FIG. 14 is a diagram illustrating an example of recording additional information as another file.

In FIG. 14, another file is generated in addition to the pcap format file. In this case, additional information is not to be arranged in the pcap format file. Instead, information such as protocol subtype, TMCC information, or timestamp are arranged as additional information, in the packet data of the packet in another file.

In this manner, additional information can be used as another file, that is, as metadata.

Note that while the above description is an exemplary case where the transmission frame of the present technology is applied to the test stream, it is also possible to apply the transmission frame of the present technology to other streams than the test stream. Furthermore, the additional information can be encoded and recorded in (part of) the file name.

<4. Flow of Processing Corresponding to Test Stream>

Next, a flow of processing executed by each of the data processing apparatuses constituting the transmission system 1 of FIG. 1 will be described with reference to flowcharts in FIGS. 15 and 16.

(Test Stream Recording/Reproducing Processing)

First, a flow of test stream recording/reproducing processing will be described with reference to the flowchart in FIG. 15.

Figure 15:
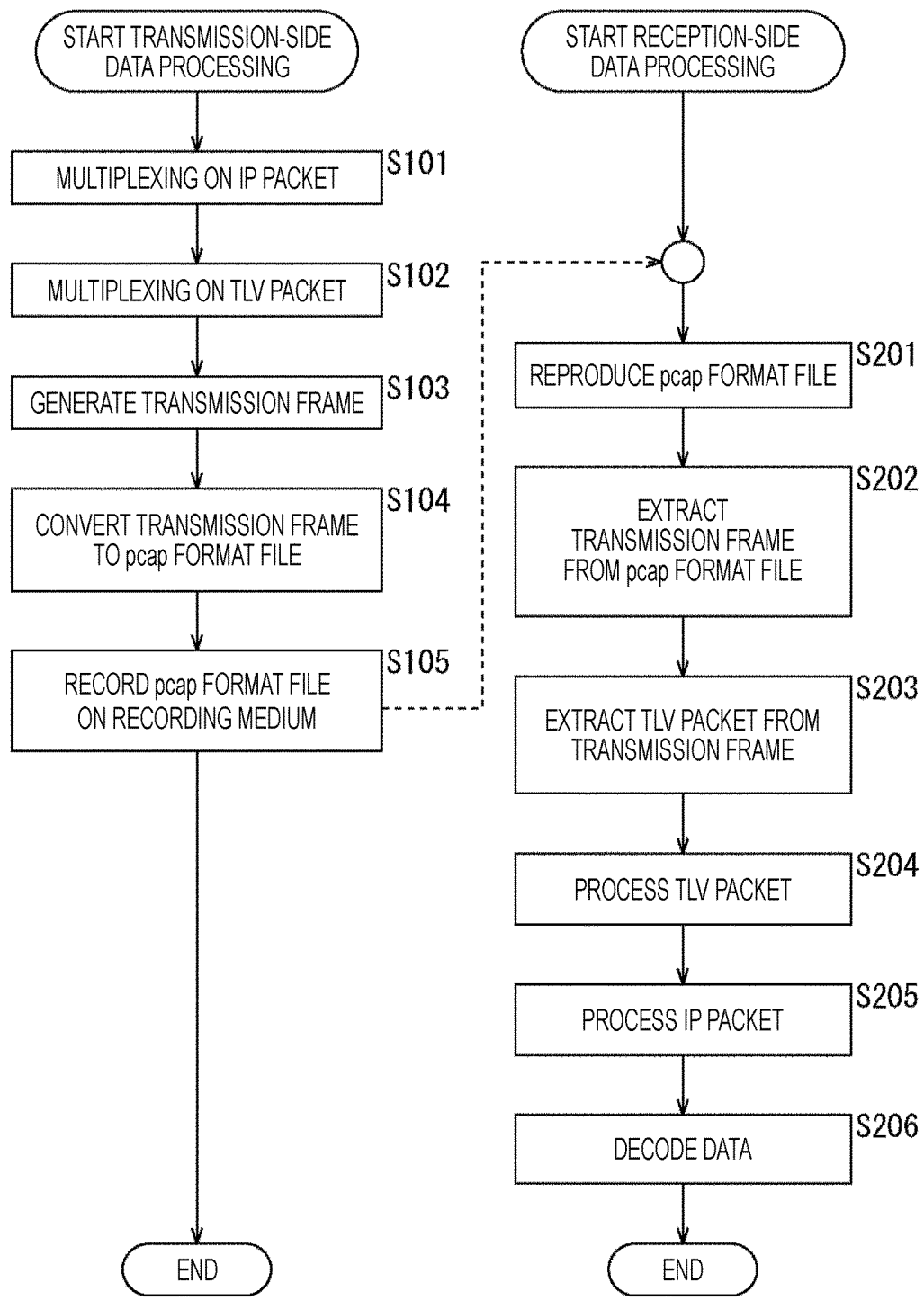
FIG. 15 is a flowchart illustrating a flow of test stream recording/reproducing processing.

Note that in FIG. 15, processing of steps S101 to S105 is to be executed by the transmission-side data processing apparatuses, namely, the broadcasting station-side data processing apparatus 10, the uplink station-side data processing apparatus 11, and the test provider-side data processing apparatus 12. Meanwhile, steps S201 to 206 are executed by the reception-side data processing apparatus, namely, the user-side data processing apparatus 20.

In step S101, the IP packet multiplexing unit 101 of the broadcasting station-side data processing apparatus 10 processes video and audio components and the stream of control information of the upper layer, so as to be multiplexed into an IP packet.

In step S102, the TLV multiplexing unit 102 of the broadcasting station-side data processing apparatus 10 processes the stream of the IP packet obtained in the processing of step S101 so as to be multiplexed into a TLV packet.

In step S103, the transmission frame generation unit 103 of the broadcasting station-side data processing apparatus 10 processes the stream of the TLV packet obtained in the processing in step S102 to generate a transmission frame.

In step S104, the pcap format converter 105 of the test provider-side data processing apparatus 12 converts the transmission frame obtained in the processing of step S103 into a pcap format file.

In step S105, the pcap format converter 105 of the test provider-side data processing apparatus 12 records the pcap format file obtained in the processing of step S104 into the recording medium 106.

Thereafter, for example, the recording medium 106 is attached to a predetermined device, and the pcap format file recorded in the recording medium 106 is read out and reproduced, so as to be input to the user-side data processing apparatus 20 (specifically, the transmission frame extraction unit 205 of the apparatus) (S201). That is, the user-side data processing apparatus 20 has received the test stream via the recording medium.

In step S202, the transmission frame extraction unit 205 of the user-side data processing apparatus 20 processes the pcap format file obtained in the processing in step S201, so as to extract the transmission frame.

At this time, the transmission format identification information has been added to the pcap format file as the protocol subtype, and thus, the transmission frame extraction unit 205 can identify the transmission format of the transmission frame as a processing target by this transmission format identification information.

This enables the user-side data processing apparatus 20 to select a correct transmission format in accordance with an identification result of the transmission format, making it possible to reliably perform correct operation. As a result, higher convenience is achieved in the use of a test stream.

Furthermore, presence information indicating the presence or absence of information such as TMCC information and timestamp has been added to the pcap format file. Accordingly, the transmission frame extraction unit 205 can discriminate whether or not information such as the TMCC information and timestamp is included in the transmission frame by the presence information.

In step S203, the TLV packet extraction unit 206 of the user-side data processing apparatus 20 processes the transmission frame obtained in the process in step S202 and extracts the TLV packet.

In step S204, the TLV packet processing unit 202 of the user-side data processing apparatus 20 processes the TLV packet obtained in the processing in step S203 and extracts the IP packet.

In step S205, the IP packet processing unit 203 of the user-side data processing apparatus 20 processes the IP packet obtained in the processing in step S204, and extracts video and audio component data.

In step S206, the decoder 204 of the user-side data processing apparatus 20 decodes the video and audio component data obtained in the processing of step S205. Note that the data obtained in the processing of step S206 is output to an external device, for example, and content such as a broadcast program is reproduced.

The flow of the test stream recording/reproducing processing has been described above.

(Test Stream Transmission/Reception Processing)

Next, a flow of test stream transmission/reception processing will be described with reference to the flowchart of FIG. 16, Note that in FIG. 16, processing of steps S151 to S157 is to be executed by the transmission-side data processing apparatuses, that is, the broadcasting station-side data processing apparatus 10, the uplink station-side data processing apparatus 11, and the test provider-side data processing apparatus 12. On the other hand, steps S251 to 254 are executed by the reception-side data processing apparatus, namely the user-side data processing apparatus 20.

Similarly to steps S101 to S105 of FIG. 15, streams of components or the like are multiplexed in steps S151 to S155 into IP packets and then multiplexed into TLV packets, so as to generate a transmission frame. Subsequently, the transmission frame as the test stream is converted into a pcap format file and recorded on the recording medium 106.

Thereafter, for example, the recording medium 106 is attached to a predetermined device, and the recorded pcap format file is read out and reproduced, so as to be input into the uplink station-side data processing apparatus 11 (specifically, the modulation unit 104 of the apparatus) (S156). That is, the uplink station-side data processing apparatus 11 has received the test stream via the recording medium.

In step S157, the modulation unit 104 of the uplink station-side data processing apparatus 11 performs necessary processing such as modulation processing on the data obtained in the processing in step S156, and transmits the resulting broadcast signal.

At this time, transmission format identification information has been added as a protocol subtype to the pcap format file, and thus the uplink station-side data processing apparatus 11 (specifically, the modulation unit 104 of the apparatus) can identify the transmission format of the transmission frame as a processing target by this transmission format identification information.

This enables the uplink station-side data processing apparatus 11 to select a correct transmission format in accordance with an identification result of the transmission format, making it possible to reliably perform correct operation. As a result, higher convenience is achieved in the use of a test stream.

Furthermore, presence information indicating the presence or absence of information such as TMCC information and timestamp has been added to the pcap format file. Accordingly, the uplink station-side data processing apparatus 11 (specifically, the modulation unit 104 of the apparatus) can discriminate whether or not information such as the TMCC information and timestamp is included in the transmission frame by the presence information.

The broadcast signal sent out from the uplink station-side data processing apparatus 11 (specifically, the modulation unit 104 of the apparatus) is received by the user-side data processing apparatus 20 via the broadcasting satellite 30.

In step S251, the demodulation unit 201 of the user-side data processing apparatus 20 performs necessary processing such as demodulation processing on the broadcast signal received from the broadcasting satellite 30 via the antenna, and further processes the resultant pcap format file. In this case, by processing the pcap format file, a transmission frame as a test stream is obtained. That is, the user-side data processing apparatus 20 has received the test stream via broadcasting.

At this time, the transmission format identification information has been added to the pcap format file as the protocol subtype, and thus, the demodulation unit 201 can identify the transmission format of the transmission frame as a processing target by this transmission format identification information.

Furthermore, presence information indicating the presence or absence of information such as TMCC information and timestamp has been added to the pcap format file. Accordingly, the demodulation unit 201 can discriminate whether or not information such as the TMCC information and timestamp is included in the transmission frame by the presence information.

Similarly to steps S204 to S206 of FIG. 15, the IP packet is further processed in steps S252 to S254 after the TLV packet obtained from the transmission frame is processed, leading to acquisition of the component data. Subsequently, the component data is decoded and output.

The flow of the test stream transmission/reception processing has been described above.

<5. Modification>

(Application to Other Broadcasting Standards)

While the above description is an example using Integrated Services Digital Broadcasting (ISDB), which is a system adopted in Japan and other countries as a standard for digital broadcasting, the present technology may be applied to Advanced Television Systems Committee (ATSC) adopted by United States and other countries, or Digital Video Broadcasting (DVB) adopted by European countries and other countries, or the like.

Furthermore, the present technology can be applied to standards of digital broadcasting represented by satellite broadcasting using a broadcasting satellite (BS), a communication satellite (CS), and the like, as well as terrestrial broadcasting, other standards such as cable broadcasting including cable television (CATV), and the like. Moreover, while the above description in an example of ISDB-S3 adopting the IP transmission scheme using IP packets, the present technology is not limited to the IP transmission scheme and may be applied to other methods such as the MPEG2 Transport Stream (MPEG2-TS) method or the like.

Another Example of Packet and Control Information

Furthermore, the terms of packets, frames, control information, or the like are merely examples, and other terms may be used in some cases. The difference between these names, however, is just a difference in formality, and there is no substantial difference in the packets, frames, control information, or the like, as a target.

For example, the TLV packet may also be referred to as an ATSC Link-layer Protocol (ALP) packet, a generic packet, or the like in some cases. Furthermore, frames and packets may be used interchangeably in some cases. Furthermore, while the above description is a case of the IP packet of Internet Protocol version 4 (IPv4), it is also allowable to use an IP packet of Internet Protocol version 6 (IPv6).

(Application to Other Standards)

In addition, the present technology is also applicable to, for example, a predetermined standard (standards other than standards for digital broadcasting) or the like prescribed on the assumption of using, as a transmission line, a transmission line other than the broadcasting transmission line (broadcasting network), that is, a communication transmission line (communication network) such as the Internet and a telephone network, and the like. In that case, a communication transmission line such as the Internet, a telephone network, or the like is used as the transmission line of the transmission system 1 (FIG. 1), and the data processing apparatus 11 and the data processing apparatus 12 can be used as servers provided on the Internet. Moreover, the communication server and the data processing apparatus 20 perform bidirectional communication via the communication transmission line such as the Internet.

(Application to Broadcast Signal Recording)

The present technology can also be applied to a broadcast signal transmitted by a digital broadcast service. That is, for example, in a digital broadcast recording apparatus (data processing apparatus 20) such as a recorder, data obtained from a received broadcast signal is converted into a pcap format file, enabling adding identification information (transmission format identification information) so as to be recorded on the recording medium 106.

<6. Configuration of Computer>

Figure 17:
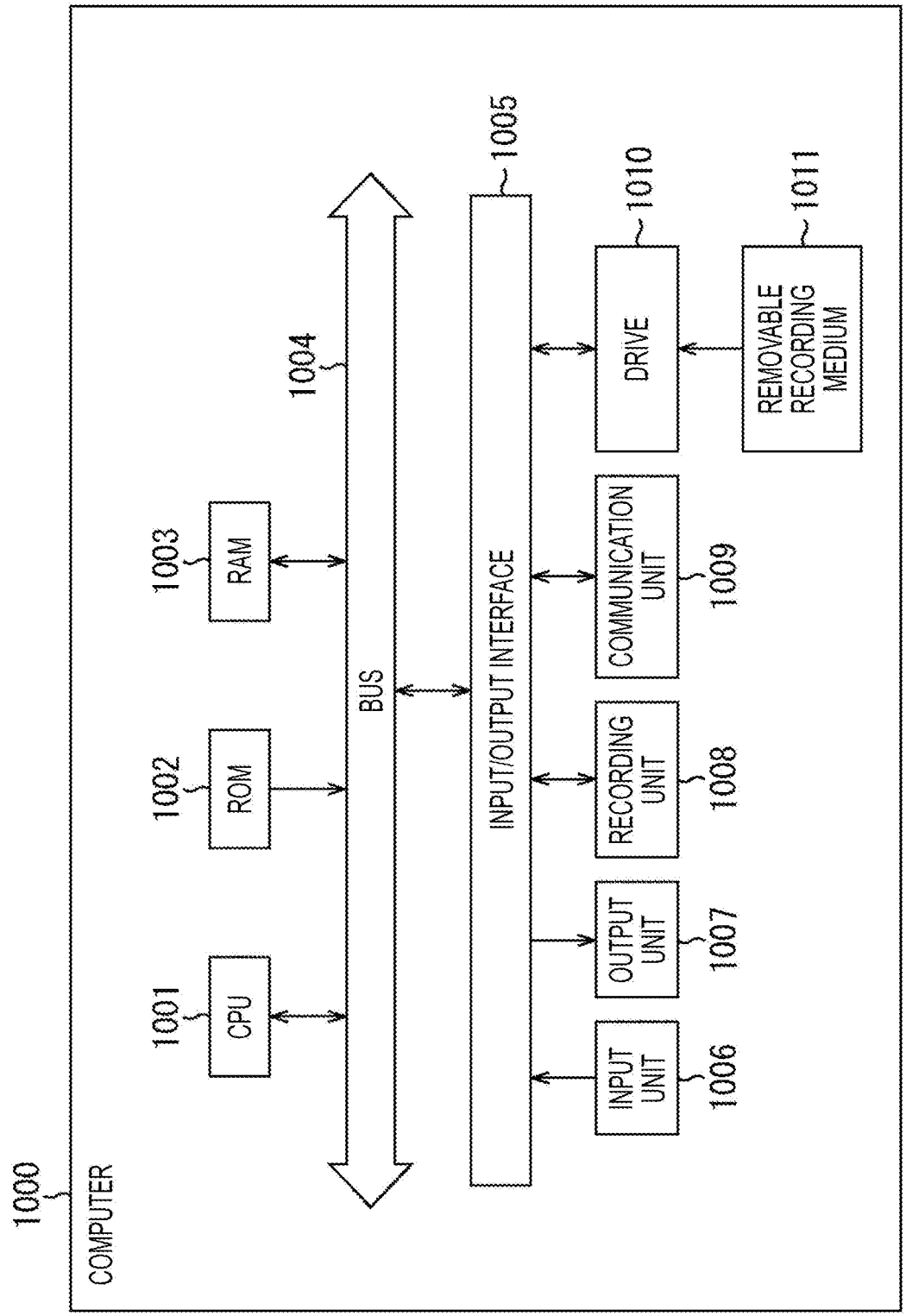
FIG. 17 is a diagram illustrating a configuration example of a computer.

A series of processing described above can be executed in hardware or with software. In a case where the series of processing is executed with software, a program included in the software is installed in a computer. FIG. 17 is a diagram illustrating an exemplary configuration of hardware of a computer that executes the series of processing described above by a program.

In a computer 1000, a central processing unit (CPU) 1001, a read only memory (ROM) 1002, a random access memory (RAM) 1003 are interconnected via a bus 1004. The bus 1004 is further connected with an input/output interface 1005. The input/output interface 1005 is connected with an input unit 1006, an output unit 1007, a recording unit 1008, a communication unit 1009, and a drive 1010.

The input unit 1006 includes a key board, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magneto-optical disk, and a semiconductor memory.

On the computer 1000 configured as above, the series of above-described processing is executed by operation such that the CPU 1001 loads a program stored in the ROM 1002 and the recording unit 1008 onto the RAM 1003 via the input/output interface 1005 and the bus 1004 and executes the program.

The program executed by the computer 1000 (CPU 1001) can be stored, for example, in the removable recording medium 1011 as a package medium or the like and be provided. Alternatively, the program can be provided via a wired or wireless transmission medium including a local area network, the Internet, and digital satellite broadcasting.

On the computer 1000, the program can be installed in the recording unit 1008 via the input/output interface 1005, by attaching the removable recording medium 1011 to the drive 1010. In addition, the program can be received at the communication unit 1009 via a wired or wireless transmission medium and be installed in the recording unit 1008. Alternatively, the program can be installed in the ROM 1002 or the recording unit 1008 beforehand.

Here, in this description, processing executed by a computer in accordance with a program need not be performed in time series in the order described in the flowchart. That is, processing executed by the computer according to the program includes processing executed in parallel or separately (e.g. parallel processing, or object processing). In addition, the program may be processed by one computer (processor) or may be processed with distributed processing by a plurality of computers.

Note that embodiments of the present technology are not limited to the above-described embodiments but can be modified in a variety of ways within the scope of the present technology.

In addition, the present technology can be configured as follows.

(1)

A data processing apparatus including a processing unit that processes a transmission frame transmitted as a broadcast signal and adds identification information for identifying a transmission format of the transmission frame.

(2)

The data processing apparatus according to (1), in which the transmission frame is converted into a file of a predetermined format.

(3)

The data processing apparatus according to (1) or (2), in which the transmission frame is capable of including control information, time information, and version information together with data of a component stream.

(4)

The data processing apparatus according to (3), in which the processing unit adds first presence information indicating presence or absence of the control information and second presence information indicating presence or absence of the time information, together with the identification information.

(5)

The data processing apparatus according to (4), in which the transmission frame is capable of further including a parity to be used in an error correction code and extension information, and the processing unit adds third presence information indicating presence or absence of the parity and fourth presence information indicating presence or absence of the extension information.

(6)

The data processing apparatus according to (4) or (5), in which the identification information, the first presence information, and the second presence information are added as type information of a protocol, and the type information, the control information, the time information, and the version information are arranged in a region obtained by extending a header of a packet defined in the predetermined format, as additional information.

(7)

The data processing apparatus according to (4) or (5), in which the identification information, the first presence information, and the second presence information are added as type information of a protocol, and the type information, the control information, the time information, and the version information are arranged in a head packet alone out of packets defined in the predetermined format, as additional information.

(8)

The data processing apparatus according to any of (2) to (7), in which the transmission frame is transmitted in a frame format of Ethernet (registered trademark), one or more type length value (TLV) packets are arranged in the transmission frame, and an Internet protocol (IP) packet containing data of a component stream is arranged in the TLV packet.

(9)

The data processing apparatus according to any of (2) to (8), in which the predetermined format is a packet capture (pcap) format, and the transmission frame is used as a test stream.

(10)

A data processing method to be used in a data processing apparatus, the method including a step, to be performed by the data processing apparatus, of processing a transmission frame transmitted as a broadcast signal, and adding identification information for identifying a transmission format of the transmission frame.

(11)

A data processing apparatus including a processing unit that processes a transmission frame in which a transmission format has been identified on the basis of identification information added to the transmission frame transmitted as a broadcast signal, the identification information being for identifying the transmission format of the transmission frame.

(12)

The data processing apparatus according to (11), in which the transmission frame has been converted into a file of a predetermined format, and the processing unit processes the transmission frame converted into the file of the predetermined format.

(13)

The data processing apparatus according to (11) or (12), in which the transmission frame is capable of including control information, time information, and version information, together with data of a component stream, and first presence information indicating presence or absence of the control information and second presence information indicating presence or absence of the time information have been added together with the identification information, to the transmission frame.

(14)

The data processing apparatus according to (13), in which in a case where the first presence information indicates that the control information is present in the transmission frame and the version information indicates that the control information has been updated, the processing unit processes the control information obtained from the transmission frame.

(15)

The data processing apparatus according to (13) or (14), in which in a case where the second presence information indicates that the time information is present in the transmission frame, the processing unit processes data of the stream obtained from the transmission frame on the basis of the time information obtained from the transmission frame.

(16)

The data processing apparatus according to any of (13) to (15), in which the identification information, the first presence information, and the second presence information are added as type information of a protocol, and the type information, the control information, the time information, and the version information are arranged in a region obtained by extending a header of a packet defined in the predetermined format, as additional information.

(17)

The data processing apparatus according to any of (13) to (15), in which the identification information, the first presence information, and the second presence information are added as type information of a protocol, and the type information, the control information, the time information, and the version information are arranged in a head packet alone out of packets defined in the predetermined format, as additional information.

(18)

The data processing apparatus according to any of (12) to (17), in which the transmission frame is transmitted in a frame format of Ethernet (registered trademark), one or more TLV packets are arranged in the transmission frame, and an IP packet containing data of a component stream is arranged in the TLV packet.

(19)

The data processing apparatus according to any of (12) to (18), in which the predetermined format is a pcap format, and the transmission frame is used as a test stream.

(20)

A data processing method to be used in a data processing apparatus, the method including a step, to be performed by the data processing apparatus, of processing a transmission frame in which a transmission format has been identified on the basis of identification information added to the transmission frame transmitted as a broadcast signal, the identification information being for identifying the transmission format of the transmission frame.

REFERENCE SIGNS LIST

1 Transmission system
10 (Broadcasting station-side) data processing apparatus
11 (Uplink station-side) data processing apparatus
12 (Test provider-side) data processing apparatus
20 (User-side) data processing apparatus
30 Broadcasting satellite
40 Network
101 IP packet multiplexing unit
102 TLV multiplexing unit
103 Transmission frame generation unit
104 Modulation unit
105 pcap format converter
106 Recording medium
107 TLV packet generation unit
108 IP packet generation unit
201 Demodulation unit
202 TLV packet processing unit
203 IP packet processing unit
204 Decoder
205 Transmission frame extraction unit
206 TLV packet extraction unit
1000 Computer
1001 CPU

The invention claimed is:

1. A data processing apparatus, comprising:
processing circuitry configured to
generate a transmission frame to be transmitted as a broadcast signal based on a type length value (TLV) packet,
add, to the transmission frame, identification information for identifying a transmission format of the transmission frame, the identification information including a predefined value that identifies one of a plurality of different arrangements of the TLV packet within the transmission frame, and
add presence information indicating whether each of a plurality of types of information is included in the transmission frame, wherein
the plurality of different arrangements includes a first arrangement in which the TLV packet is located across a plurality of transmission frames and a second arrangement in which the TLV packet is not located across the plurality of transmission frames, and
the identification information and the presence information are indicated by different bits of a protocol subtype included in the transmission frame.

2. The data processing apparatus according to claim 1, wherein the processing circuitry is further configured to convert the transmission frame into a file of a predetermined format.

3. The data processing apparatus according to claim 2, wherein the transmission frame includes control information, time information, version information, and data of a component stream.

4. The data processing apparatus according to claim 3, wherein the presence information includes (i) first presence information indicating presence or absence of the control information and (ii) second presence information indicating presence or absence of the time information and the identification information.

5. The data processing apparatus according to claim 4, wherein
the transmission frame includes a parity to be used in an error correction code and extension information, and
the presence information includes (i) third presence information indicating presence or absence of the parity and (ii) fourth presence information indicating presence or absence of the extension information.

6. The data processing apparatus according to claim 4, wherein
the identification information, the first presence information, and the second presence information are added as type information of a protocol, and
the type information, the control information, the time information, and the version information are arranged in a header extension of a packet in the file of the predetermined format, as additional information.

7. The data processing apparatus according to claim 4, wherein
the identification information, the first presence information, and the second presence information are added as type information of a protocol, and
the type information, the control information, the time information, and the version information are arranged only in a head packet in the file of the predetermined format, as additional information.

8. The data processing apparatus according to claim 2, wherein
the transmission frame is transmitted in a frame format of Ethernet, and
an Internet protocol (IP) packet containing data of a component stream is arranged in the TLV packet.

9. The data processing apparatus according to claim 8, wherein
the predetermined format of the file is a packet capture (pcap) format, and
the transmission frame is used as a test stream.

10. A data processing method in a data processing apparatus, the method comprising:
generating a transmission frame to be transmitted as a broadcast signal based on a type length value (TLV) packet;
adding, by circuitry of the data processing apparatus, identification information for identifying a transmission format of the transmission frame to the transmission frame, the identification information including a predefined value that identifies one of a plurality of different arrangements of the TLV packet within the transmission frame; and
adding presence information indicating whether each of a plurality of types of information is included in the transmission frame, wherein the plurality of different arrangements includes a first arrangement in which the TLV packet is located across a plurality of transmission frames and a second arrangement in which the TLV packet is not located across the plurality of transmission frames, and the identification information and the presence information are indicated by different bits of a protocol subtype included in the transmission frame.

11. A data processing apparatus, comprising:

processing circuitry configured to receive a transmission frame transmitted as a broadcast signal, wherein the transmission frame is generated based on a type length value (TLV) packet, the transmission frame includes (i) identification information for identifying a transmission format of the transmission frame and (ii) presence information indicating whether each of a plurality of types of information is included in the transmission frame, the identification information including a predefined value that identifies one of a plurality of different arrangements of the TLV packet within the transmission frame, the plurality of different arrangements includes a first arrangement in which the TLV packet is located across a plurality of transmission frames and a second arrangement in which the TLV packet is not located across the plurality of transmission frames, and the identification information and the presence information are indicated by different bits of a protocol subtype included in the transmission frame.

12. The data processing apparatus according to claim 11, wherein the transmission frame is a file of a predetermined format.

13. The data processing apparatus according to claim 12, wherein the transmission frame includes control information, time information, version information, and data of a component stream, and the presence information includes (i) first presence information indicating presence or absence of the control information and (ii) second presence information indicating presence or absence of the time information.

14. The data processing apparatus according to claim 13, wherein when the first presence information indicates that the control information is present in the transmission frame and the version information indicates that the control information is updated, the processing circuitry is further configured to process the control information obtained from the transmission frame.

15. The data processing apparatus according to claim 13, wherein when the second presence information indicates that the time information is present in the transmission frame, the processing circuitry is further configured to process data of the component stream obtained from the transmission frame based on the time information obtained from the transmission frame.

16. The data processing apparatus according to claim 13, wherein the identification information, the first presence information, and the second presence information are added as type information of a protocol, and the type information, the control information, the time information, and the version information are arranged in a header extension of a packet in the file of the predetermined format, as additional information.

17. The data processing apparatus according to claim 13, wherein the identification information, the first presence information, and the second presence information are added as type information of a protocol, and the type information, the control information, the time information, and the version information are arranged only in a head packet in the file of the predetermined format, as additional information.

18. The data processing apparatus according to claim 12, wherein the transmission frame is transmitted in a frame format of Ethernet, and an IP packet containing data of a component stream is arranged in the TLV packet.

19. The data processing apparatus according to claim 18, wherein the predetermined format of the file is a packet capture (pcap) format, and the transmission frame is used as a test stream.

20. A data processing method to be used in a data processing apparatus, the method comprising:

receiving, by circuitry of the data processing apparatus, a transmission frame transmitted as a broadcast signal, wherein the transmission frame is generated based on a type length value (TLV) packet, the transmission frame includes (i) identification information for identifying a transmission format of the transmission frame and (ii) presence information indicating whether each of a plurality of types of information is included in the transmission frame, the identification information including a predefined value that identifies one of a plurality of different arrangements of the TLV packet within the transmission frame, the plurality of different arrangements includes a first arrangement in which the TLV packet is located across a plurality of transmission frames and a second arrangement in which the TLV packet is not located across the plurality of transmission frames, and the identification information and the presence information are indicated by different bits of a protocol subtype included in the transmission frame.

* * * * *